US007294080B2

(12) United States Patent
Hoshino

(10) Patent No.: US 7,294,080 B2
(45) Date of Patent: Nov. 13, 2007

(54) ROTATIONAL DRIVE DEVICE AND PROCESSING DEVICE USING THE SAME

(75) Inventor: Takashi Hoshino, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 748 days.

(21) Appl. No.: 10/844,396

(22) Filed: May 13, 2004

(65) Prior Publication Data

US 2005/0049050 A1 Mar. 3, 2005

(30) Foreign Application Priority Data

Aug. 29, 2003 (JP) ............................ 2003-307320

(51) Int. Cl.
*F16H 48/06* (2006.01)

(52) U.S. Cl. ...................................................... 475/149

(58) Field of Classification Search ................ 475/149; 74/574.4; 399/167
See application file for complete search history.

(56) References Cited

U.S. PATENT DOCUMENTS 6,456,807 B1 * 9/2002 Makino et al. ............. 399/167

FOREIGN PATENT DOCUMENTS

| | | |
|---|---|---|
| JP | 4-155352 | 5/1992 |
| JP | 10-4476 | 1/1998 |
| JP | 10-333387 | 12/1998 |
| JP | 2001-188438 | 7/2001 |
| JP | 2002-78289 | 3/2002 |
| JP | 2002-171721 | 6/2002 |

* cited by examiner

*Primary Examiner*—Dirk Wright
(74) *Attorney, Agent, or Firm*—Morgan, Lewis & Bockius LLP

(57) ABSTRACT

A rotational drive device includes a drive motor and a drive transmission mechanism that are coupled together via an input coupling. The input coupling includes a coupling body that is coupled and fixed to an output shaft of the drive motor. A vibration damper that projects outward and damps vibration from the drive motor is disposed at an outer peripheral portion of the coupling body.

12 Claims, 22 Drawing Sheets

40

ROTATIONAL DRIVE DEVICE AND PROCESSING DEVICE USING THE SAME

BACKGROUND OF THE INVENTION

1. Field of the Invention

The present invention relates to a rotational drive device that rotatingly drives a rotated body. In particular, the present invention relates to the improvement of a rotational drive device, of an aspect where a drive motor and a drive transmission mechanism are coupled together via an input coupling, and various processing devices, such as image forming devices, using the rotational drive device.

2. Description of the Related Art

Conventionally, in rotational drive devices that rotatingly drive a rotated body, a system has been widely used where the driving force from a drive motor is directly transmitted to the rotated body or is damped down with a drive transmission mechanism and then it is transmitted to the rotated body (e.g., see Patent Documents 1 to 3).

In this type of rotational drive device, in a case where, for example, a planetary speed-reducing mechanism (planetary roll speed-reducing mechanism, planetary gear speed-reducing mechanism) is used as the drive transmission mechanism, it is necessary to coaxially couple the rotating shaft of the rotated body with the drive shaft of the drive motor via the planetary speed-reducing mechanism (e.g., see Patent Documents 1 and 3), and the axial-direction length ends up being long in comparison to an aspect where a non-coaxial type speed-reducing mechanism resulting from an ordinary gear train (aspect where the rotating shaft of the rotated body and the drive shaft of the drive motor are not coaxially disposed) is used.

Moreover, in a case where a stepping motor is used as the drive motor, it becomes easy for vibration generated by the stepping motor itself to result in unevenness in the rotation of the rotated body. Thus, a method where a flywheel or a dynamic damper is attached to the side of the drive motor opposite from the output shaft and a method where a flywheel is attached to one end of the rotating shaft of the rotated body (e.g., see Patent Documents 4 and 5) have been used from the standpoint of increasing the moment of inertia of the rotor and reducing uneven rotation of the motor itself.

Patent Document 1: JP-A-4-155352 (“Configuration” and FIG. 2)

Patent Document 2: JP-A-10-333387 (“Embodiments of the Invention” and FIG. 1)

Patent Document 3: JP-A-2002-78289 (“Embodiments of the Invention” and FIG. 1)

Patent Document 4: JP-A-2001-188438 (“Embodiments of the Invention” and FIG. 1)

Patent Document 5: JP-A-10-4476 (“Embodiments of the Invention” and FIG. 1)

Patent Document 6: JP-A-2002-171721 (“Embodiments of the Invention” and FIG. 2)

In the rotational drive devices of Patent Documents 1 and 2, a configuration is ordinarily used where, as shown for example in FIGS. 21 and 22, a drive motor 510 and a drive transmission mechanism 520 are coaxially coupled together via an input coupling 530. Thus, a situation where the axial-direction length of the rotational drive device increases cannot be avoided in comparison to an aspect using a non-coaxial type drive transmission mechanism, and there is a demand to shorten as much as possible the axial-direction length of the rotational drive device. It should be noted that, in FIG. 21, reference numeral 511 represents a housing of the drive motor 510, reference numeral 521 represents a housing of the drive transmission mechanism 520, and both housings 511 and 521 are fixed with fasteners such as screws. Also, the housing 521 of the drive transmission mechanism 520 is omitted from FIG. 22.

The input coupling 530 used here has the role of absorbing the slight oscillating movement of the shaft, which is generated by the straightness error of the shaft of the drive motor 510 and squareness error with the attachment surface, and transmitting rotational motion to the drive transmission mechanism 520. When an output shaft 512 of the drive motor 510 and the drive transmission mechanism 520 are directly coupled together without intervening the input coupling 530, as in Patent Document 3, the drive transmission mechanism 520 directly receives the oscillating movement of the drive motor 510 shaft and it becomes easy for large load torque fluctuations to arise. Also, there are many cases where the material characteristics respectively demanded of the output shaft 512 of the drive motor 510 and the drive transmission mechanism 520 are different, and in these cases also it is effective to couple the output shaft 512 of the drive motor 510 and the drive transmission mechanism 520 via the input coupling 530.

Additionally, as mentioned above, in an aspect using a stepping motor as the drive motor 510, as shown in FIGS. 20 and 21, a flywheel 540 must be disposed at the side of the drive motor 510 opposite from the output shaft 512, or a flywheel must be disposed at one end of the rotating shaft of the rotated body, in order to prevent the transmission of vibration from the drive motor 510. Thus, with respect to the axial-direction length of the rotational drive device and the rotated body, consideration must be given to the space in which the flywheel is disposed and, as a result, a situation where the axial-direction length of the rotational drive device and the rotated body further increases cannot be avoided.

In order to solve this technical problem, in a photosensitive drum drive where it is desirable for rotational vibration to be prevented, it is common to use an outer rotor type DC brushless motor for the drive motor of the rotational drive device so that a flywheel effect is imparted to the rotor of the motor (e.g., see Patent Document 6). However, in this case, it becomes impossible to finely adjust the rotational speed of the drive motor due to the affect of the flywheel effect. That is, both the angle error and speed unevenness of the drive motor cannot be simultaneously made small. In, for example, a tandem color printer, this leads to not being able to respond to the demand to synchronize, with high precision, plural photosensitive drums and eliminate image stripes (banding) resulting from rotational unevenness in order to raise color stability like printing.

SUMMARY OF THE INVENTION

The present invention has been made in view of the above circumstances and provides, assuming a rotational drive device where a drive motor and a drive transmission mechanism are coupled together via an input coupling, a rotational drive device whose axial-direction length is not needlessly increased and that can effectively prevent the transmission of vibration from the drive motor with a simple configuration. The present invention also provides a processing device using the rotational drive device.

That is, as shown in FIG. 1, the present invention is a rotational drive device where a drive motor 1 and a drive transmission mechanism 2 are coupled together via an input coupling 3, wherein the input coupling 3 includes a coupling body 4 that is coupled and fixed to an output shaft 1*a* of the drive motor 1, and a vibration damper 5 that projects outward and damps vibration from the drive motor 1 is disposed at an outer peripheral portion of the coupling body 4.

With respect to this technical means, the drive motor 1 may be appropriately selected. However, the present invention is particularly effective in an aspect using a stepping motor because the transmission of vibration from the drive motor 1 is remarkable in an inner rotor type drive motor, such as a stepping motor, that resonates easily.

Moreover, the drive transmission mechanism 2 may be appropriately selected as long as it can be coupled together with the drive motor 1 via the input coupling 3. A representative aspect of this type of drive transmission mechanism 2 is a planetary speed-reducing mechanism.

In a case where a planetary speed-reducing mechanism is used as the drive transmission mechanism 2, the overall axial-direction dimension increases because one is left with no choice but to coaxially couple a rotated body 6, the drive motor 1 and the drive transmission mechanism 2. However, when the present invention is used, the present invention is particularly effective in that it becomes possible to avoid a situation where the axial-direction dimension is needlessly increased.

Also, although it is possible for the input coupling 3 to be respectively coupled to the drive motor 1 or the drive transmission mechanism 2, a system is ordinarily used where, in consideration of workability at the time of coupling with the input coupling 3, the input coupling 3 is premounted to one (e.g., the drive transmission mechanism 2) and coupled to the drive motor 1 in this state.

Here, the coupling body 4 of the input coupling 3 may have an optional shape as long as it is a coupling element, and representative examples thereof include a coupling body disposed with a cross-sectionally round outer peripheral portion.

Additionally, the coupling structure between the input coupling 3 and the output shaft 1*a* of the drive motor 1 may be appropriately selected. Representative examples thereof include a structure where a coupling hole 4*a* is disposed in the coupling body 4 of the input coupling 3, the output shaft 1*a* of the drive motor 1 is fitted into the coupling hole 4*a*, and the output shaft 1*a* is fixed by a fastener such as a lock screw (not shown) to the coupling body 4.

The coupling structure between the input coupling 3 and the drive transmission mechanism 2 may also be appropriately selected. Representative examples thereof include a structure where a coupling shaft 4*b* serving as an input shaft of the drive transmission mechanism 2 is coupled and fixed to the coupling body 4. The method of fixing the coupling shaft 4*b* may be appropriately selected. For example, an unillustrated coupling hole may be disposed in the coupling body 4 and the coupling shaft 4*b* may be press-fitted into this coupling hole.

Moreover, the vibration damper 5 widely includes dampers having the action of damping the vibration from the drive motor 1, such as a damper disposed on part or all of the outer peripheral portion of the coupling body 4, and also includes aspects where the damper is discontinuously disposed in addition to aspects where the damper has a continuously formed annular shape (so-called flywheel).

By disposing the vibration damper 5 at the input coupling 3 in this manner, vibration from the drive motor 1 is damped by the vibration damper 5 of the input coupling 3. Thus, it is not necessary to separately add an external vibration damping member 7, such as a flywheel or a dynamic damper, to the drive motor 1.

Representative aspects of the vibration damper 5 particularly include an aspect where the vibration damper is configured by a flywheel that uniformly projects in the radial direction from the outer peripheral portion of the coupling body 4. According to this aspect, the effect of easily damping vibration with a flywheel effect is obtained.

Also, the vibration damper 5 may be configured by a member that is separate from the coupling body 4 or be integrally formed with the coupling body 4. In an aspect using a separate member, adjustment of the vibration damping effect becomes simple, and in the aspect of the integrally formed configuration, the manufacturing process can be simplified, which is preferable.

Here, with respect to an aspect where the vibration damper 5 is integrally disposed with the entire outer peripheral portion of the coupling body 4, if there is a portion with a larger diameter than the input coupling 3 of a coupling strength and an ordinary diameter dimension that is structurally necessary of coupling attachment portions, it is possible to understand this portion as the vibration damper 5.

Examples of preferable aspects of the vibration damper 5 having a flywheel configuration include an aspect where the vibration damper 5 is a flywheel with a thickness dimension that is shorter than the thickness direction dimension of the outer peripheral portion of the coupling body 4. According to this aspect, the attachment structure of the input coupling 3 can be configured by disposing an existing attachment portion to the coupling body 4 and disposing the flywheel serving as the vibration damper 5 at a site avoiding this attachment portion. Thus, vibration damping can be realized while simplifying the attachment structure of the input coupling 3.

Other preferable aspects include an aspect where the vibration damper 5 is a flywheel including an elastic body. When the flywheel serving as the vibration damper 5 includes an elastic element in this manner, a dynamic damping effect is added and the vibration damping effect is further exhibited, which is preferable.

In particular, it is preferably for the vibration damper 5 to be a flywheel in which an annular member is coupled to the coupling body 4 via the elastic body, whereby a dynamic damping effect can be sufficiently exhibited.

Moreover, with respect to the outer diameter dimension of the flywheel serving as the vibration damper 5, an aspect where the vibration damper 5 is configured by a flywheel having an outer diameter that is three or more times the axial diameter of the drive motor 1 is preferable. By using a flywheel of this dimension, the flywheel has sufficient inertia and a flywheel effect can be reliably achieved.

Examples of modified modes of the housing of the drive motor 1 include a mode where at least part of the housing of the drive transmission mechanism 2 is integrally disposed with part of the motor housing. According to this aspect, the axial-direction length of the rotational drive device can be further shortened because an element for coupling the respective housings becomes unnecessary.

Moreover, the present invention is not limited to the aforementioned rotational drive device and also includes a processing device (including an image forming device) using the rotational drive device.

Examples of the invention in this case include a processing device disposed with the aforementioned rotational drive device and a rotated body 6 that is rotatingly driven by the rotational drive device.

In this case, it is necessary to couple together the output drive shaft of the rotational drive device-specifically, the output drive shaft 2*a* of the drive transmission mechanism 2—and the drive transmission shaft 6*a* of the rotated body 6. The connection structure thereof may be of an aspect using an input coupling, but a structure where both shafts are coupled without using an input coupling (e.g., a structure where a coupling hole 6*b* is disposed in the drive transmission shaft 6*a*, the output drive shaft 2*a* of the drive transmission mechanism 2 is fitted in the coupling hole 6*b* and fixed with a fastener such as a screw) is preferable with respect to the demand to shorten the axial-direction dimension.

As described above, according to the rotational drive device pertaining to the present invention, in an aspect where the drive motor and the drive transmission mechanism are coupled together via the input coupling, a vibration damper that damps vibration from the drive motor is disposed at the input coupling. Thus, vibration from the drive motor can be effectively damped without adding a flywheel or a dynamic damper, which are separate members, to the drive motor and without needlessly increasing the axial-direction dimension of the rotational drive device.

Also, in a processing device using this rotational drive device, vibration from the drive motor can be effectively damped without adding a flywheel to the rotated body and without needlessly increasing the axial-direction dimension of the rotational drive device and the rotated body. Thus, the processing device itself can be made compact, and unevenness in the rotation of the rotated body accompanying the vibration from the drive motor can be effectively prevented.

BRIEF DESCRIPTION OF THE DRAWINGS

Preferred embodiments of the present invention will be described in detail based on the following figures, wherein.

DETAILED DESCRIPTION OF THE INVENTION

The invention will be described in detail below on the basis of the embodiments shown in the attached drawings.

First Embodiment

Figure 2:
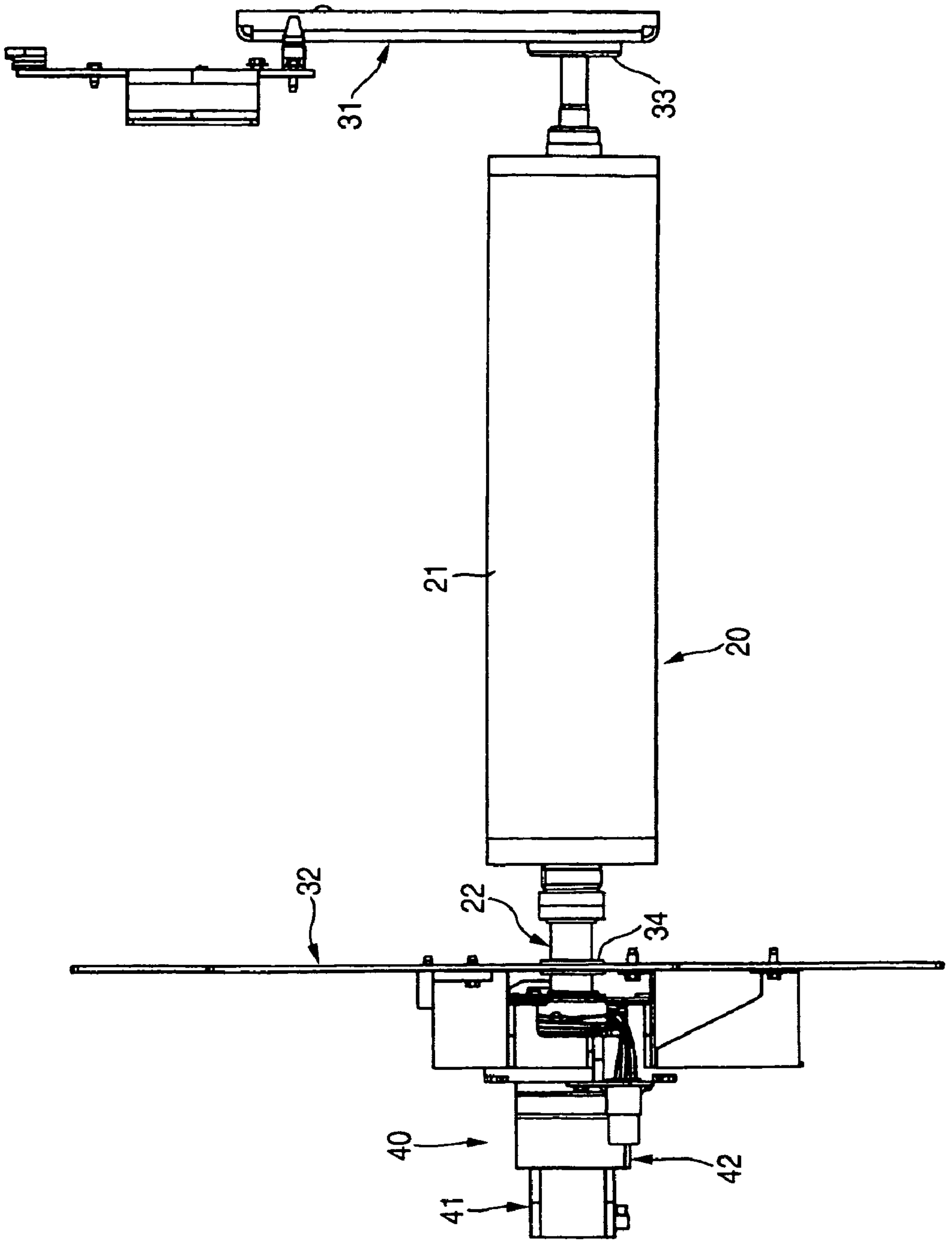
FIG. 2 is an explanatory drawing showing a first embodiment of an image forming device to which the invention has been applied.

FIG. 2 shows a first embodiment of an image forming device to which the invention has been applied.

In FIG. 2, a photosensitive drum 20 includes a transmission drive shaft 22 that passes through the axial direction of a drum body 21. The transmission drive shaft 22, which projects from both ends of the photosensitive drum 20, is rotatably supported via shaft-receiving portions 33 and 34, such as ball bearings, at front and rear frames 31 and 32 of a device case, whereby the photosensitive drum 20 is supported.

Figure 3:
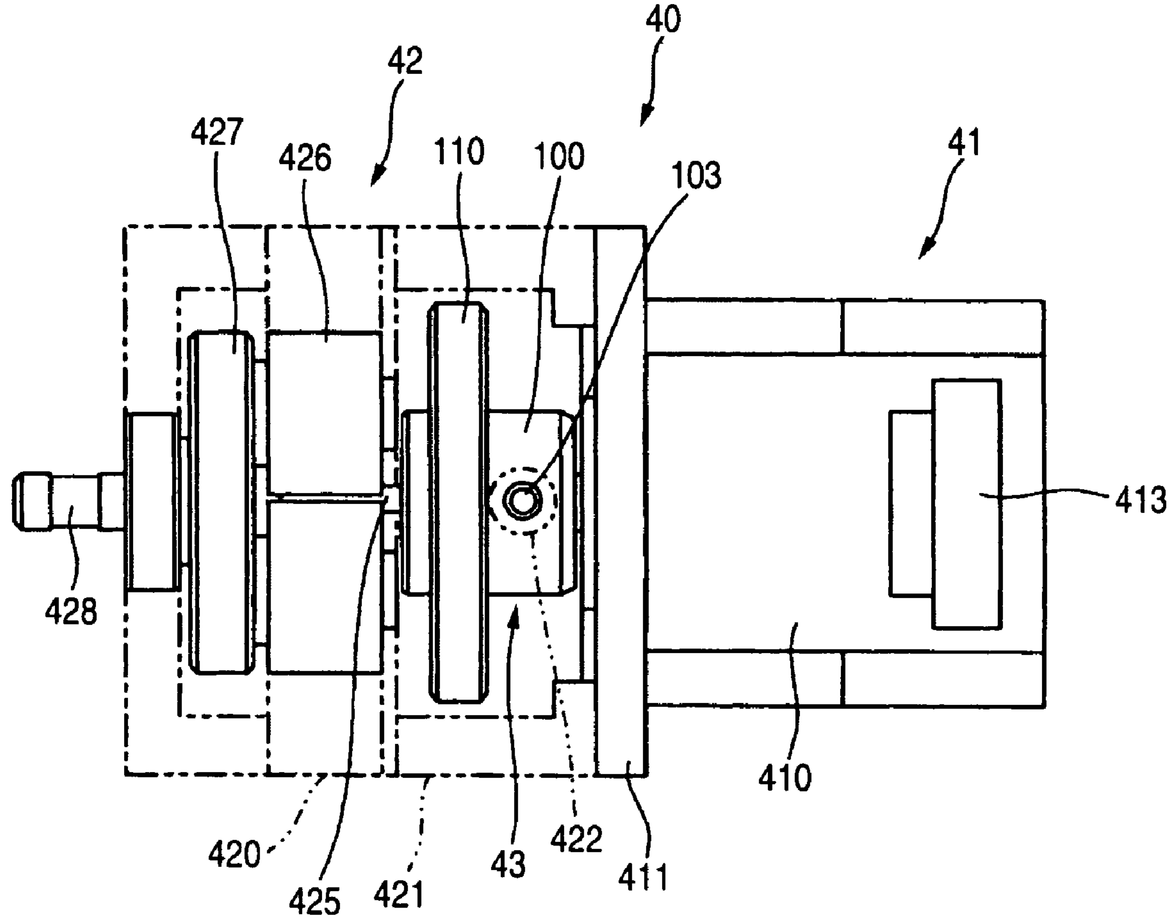
FIG. 3 is an explanatory drawing showing the outline of the rotational drive device used in the first embodiment.
Figure 4:
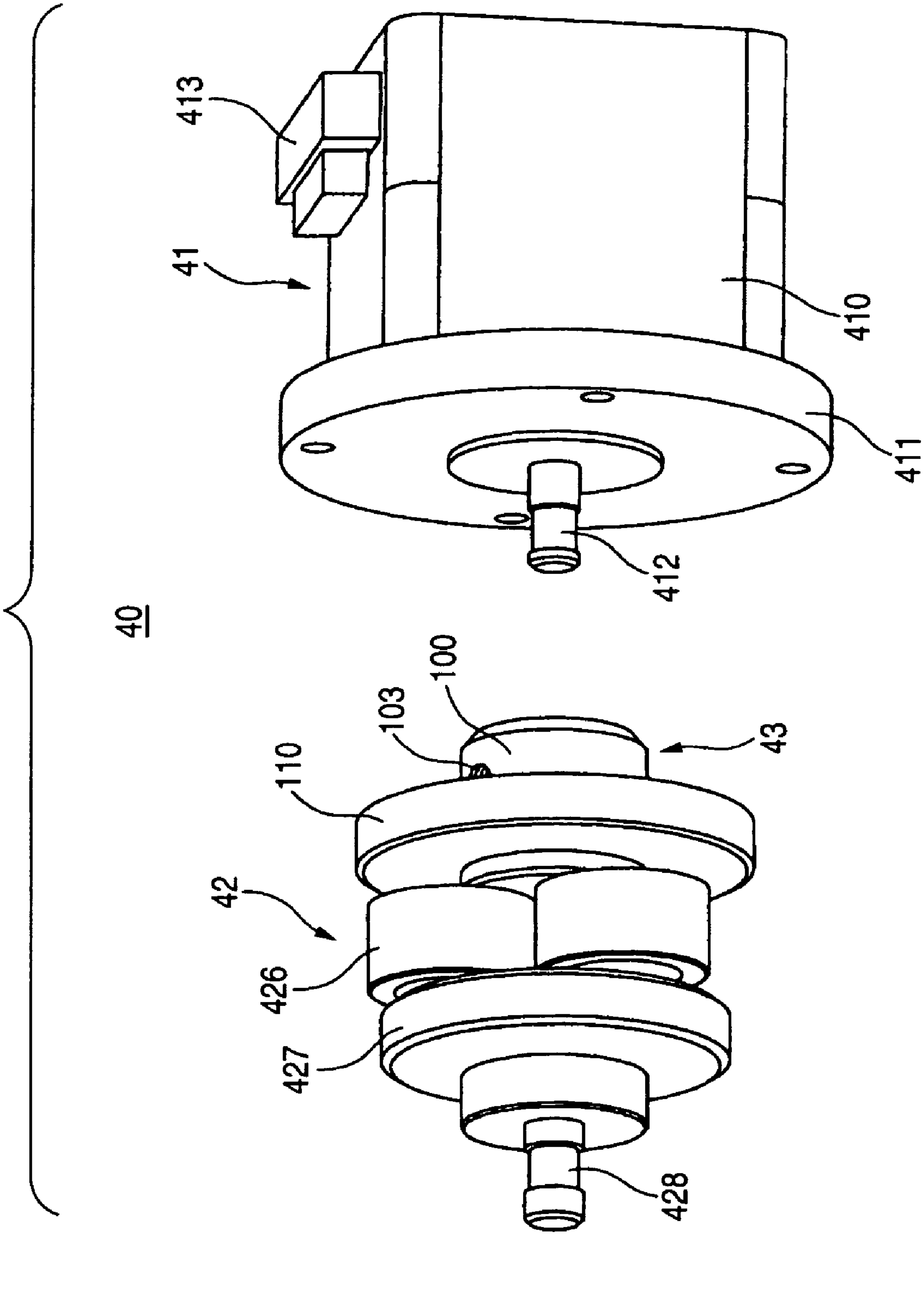
FIG. 4 is an exploded perspective view of the rotational drive device.

In the present embodiment, as shown in FIGS. 2 to 4, a rotational drive device 40 is disposed at an outer side of the rear frame 32. The rotational drive device 40 is configured by a drive motor 41, such as a stepping motor, and a speed-reducing mechanism 42 that is coupled to the drive motor 41 via an input coupling 43.

In the present embodiment, the drive motor 41 includes a joint flange 411 at one end of a motor housing 410 and is disposed with an output shaft 412 that projects from the joint flange 411 side. It should be noted that, in the drawings, reference numeral 413 represents a lead wire connection portion of the drive motor 41.

The speed-reducing mechanism 42 uses, for example, a planetary roll speed-reducing mechanism. The planetary speed-reducing mechanism is disposed with a sun roll 425 to which the rotation of the drive motor 41 is inputted, plural (e.g., three) planetary rolls 426 disposed around the sun roll 425, a carrier 427 that supports the plural planetary rolls 426, and an output drive shaft 428 that is coaxially disposed with the sun roll 425 and outputs the rotation whose speed has been reduced by the planetary rolls 426. These constituent elements are stored in a housing 420. It should be noted that the housing 420 is not shown in FIG. 4.

The housing 420 of the speed-reducing mechanism 42 includes, at one end thereof, a hollow cylindrical projecting portion 421 in which the input coupling 43 can be accommodated. A leading end portion of the cylindrical projecting portion 421 abuts against the joint flange 411 of the motor housing 410; and this leading end portion and the joint flange 411 are fastened together with unillustrated fasteners such as screws.

Figure 5A:
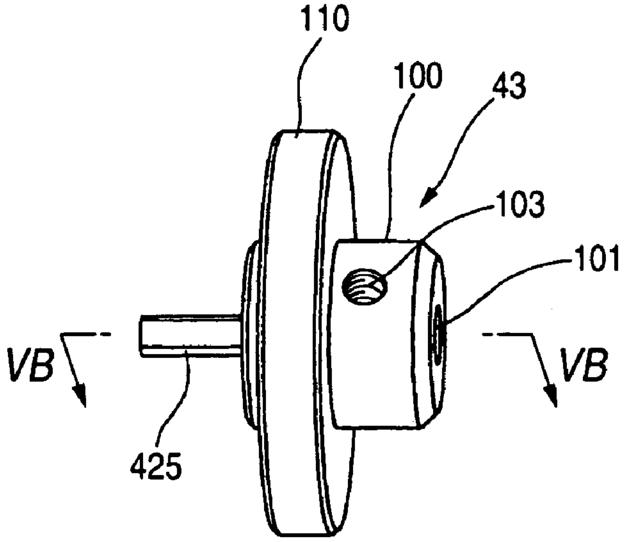
FIG. 5A is an explanatory drawing showing the outline of an input coupling used in the embodiments.
Figure 5B:
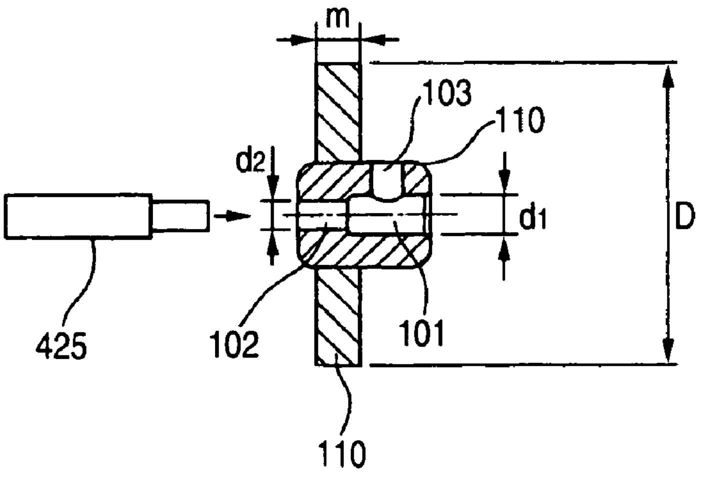
FIG. 5B is a cross-sectional explanatory view of the input coupling along line VB-VB.

In particular, in the present embodiment, the input coupling 43 is formed by, for example, S45C and, as shown in FIGS. 4, 5A and 5B, a thick cylindrical coupling body 100. An annular disc flywheel 110 is disposed so as to project outward near the speed-reducing mechanism 42 at an outer peripheral surface of the coupling body 100.

Here, the coupling body 100 includes a first coupling hole 101 (having a hole diameter $d_1$ in the present example) through which the output shaft 412 of the drive motor 41 is passed. A female screw hole 103 that passes through to the first coupling hole 101 is formed in an outer peripheral portion of the coupling body 100 facing the first coupling hole 101. The coupling body 100 also includes a second coupling hole 102 (having a hole diameter $d_2$ in the present example, where $d_2$ ? $d_1$) through which the sun roll 425 of the speed-reducing mechanism 42 is passed. It should be noted that, although the first and second coupling holes 101 and 102 in the present example have different hole diameters, the first and second coupling holes are not limited thereto and may also have the same hole diameters as long as the output shaft 412 of the drive motor 41 has the same diameter as that of the sun roll 425.

Additionally, in the present embodiment, the input coupling 43 is premounted at the speed-reducing mechanism 42 side. For example, a system is used where the sun roll 425 is press-fitted and fixed in the second coupling hole 102 of the coupling body 100.

Also, with respect to coupling the input coupling 43 to the output shaft 412 of the drive motor 41, a system is used where the output shaft 412 is fitted into the first coupling hole 101 of the coupling body 100 and the coupling body 100 and the output shaft 412 are fixed with a lock screw fastener (not shown) via the female screw hole 103. It should be noted that a work hole 422 for enabling this coupling is formed in the cylindrical projecting portion 421 of the housing 420 of the speed-reducing mechanism 42.

Here, the flywheel 110 is formed as an annular member with an appropriate material to have a predetermined outer diameter dimension D and a thickness dimension m from the standpoint of obtaining a desired inertial force and is press-fitted, and fixed with another method, to the outer peripheral surface of the coupling body 100.

Although the outer diameter dimension D of the flywheel 110 may be appropriately selected, it is preferable for it to be at least three times the size of the outer diameter dimension $d_1$ (corresponding to the hole diameter of the first coupling hole 101) of the output shaft 412 of the drive motor 41.

Also, in the present embodiment, because the flywheel 110 is disposed at part of the outer peripheral surface of the coupling body 100, it becomes possible to dispose the female screw hole 103 in an outer peripheral part of the coupling body 100 where the flywheel 110 is not present, and the input coupling 43 and output shaft 412 of the drive motor 41 are coupled together in the same manner as described above.

Figure 6A:
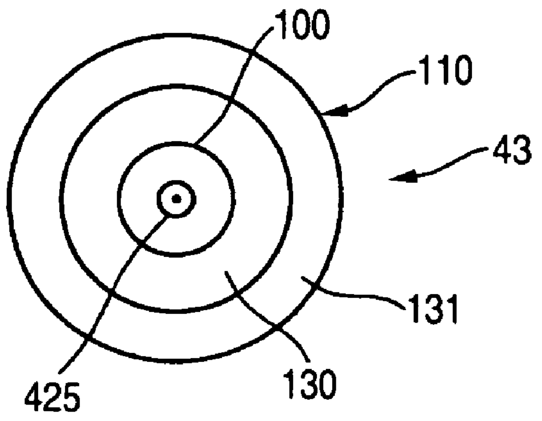
FIG. 6A is a front explanatory drawing showing another aspect of the input coupling.
Figure 6B:
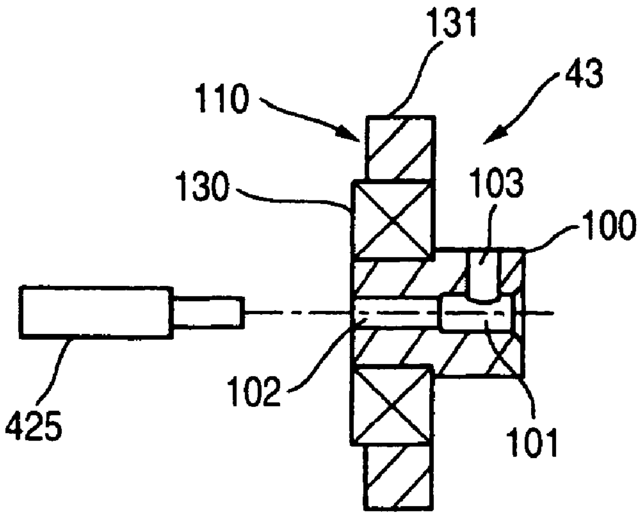
FIG. 6B is a cross-sectional explanatory view of that input coupling.

In the present embodiment, the configuration of the flywheel 110 may be appropriately selected. For example, as shown in FIGS. 6A and 6B, the flywheel 110 may be of an aspect where a damper ring 131 is fitted and mounted, by press fitting, onto part of the outer peripheral surface of the coupling body 100 via a bearing 130.

Here, the damper ring 131 may be fixed to an existing outer case of the bearing 130 or integrally disposed with the outer case of the bearing 130.

Also, the bearing 130 may be an ordinary bearing where rolling elements, such as balls or rolls, are intervened between the inner case and the outer case, but a rubber seal bearing, in which the space between the inner case and the outer case is sealed with a seal material such as rubber, is preferable.

Figure 7A:
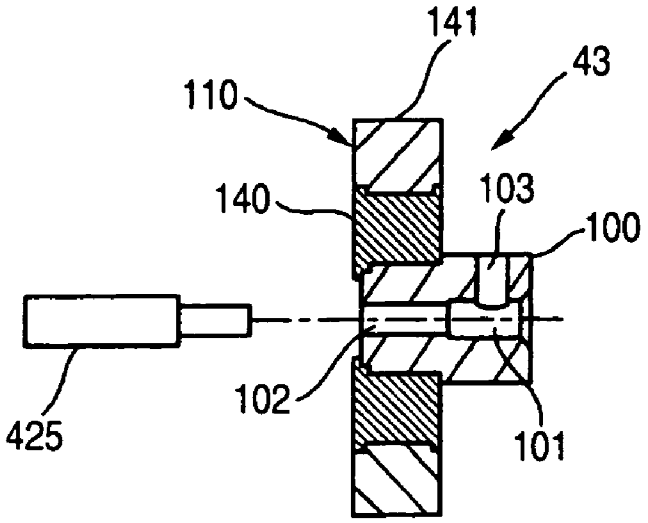
FIGS. 7A and 7B are cross-sectional explanatory drawings respectively showing yet other aspects of the input coupling.

Moreover, as shown in FIG. 7A, the flywheel 110 may be of another aspect where a damper ring 141 is fitted and mounted, via a rubber ring 140, to part of the outer peripheral surface of the coupling body 100. In this case, the rubber ring 140 adheres the outer peripheral surface of the coupling body 100 and the inner periphery of the damper ring 141 together.

Figure 7B:
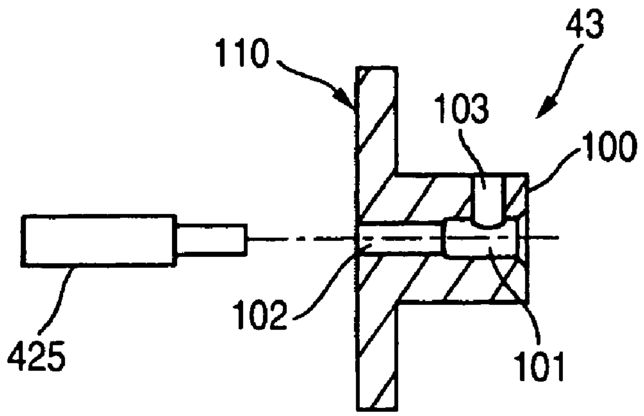

Moreover, although the flywheel 110 may be configured as a separate member from the coupling body 100, it may also be integrally formed with the coupling body 100 as shown in FIG. 7B.

Moreover, in the present embodiment, the drive coupling structure between the output drive shaft 428 of the speed-reducing mechanism 42 and the transmission drive shaft 22 of the photosensitive drum 20 is as follows.

Figure 8:
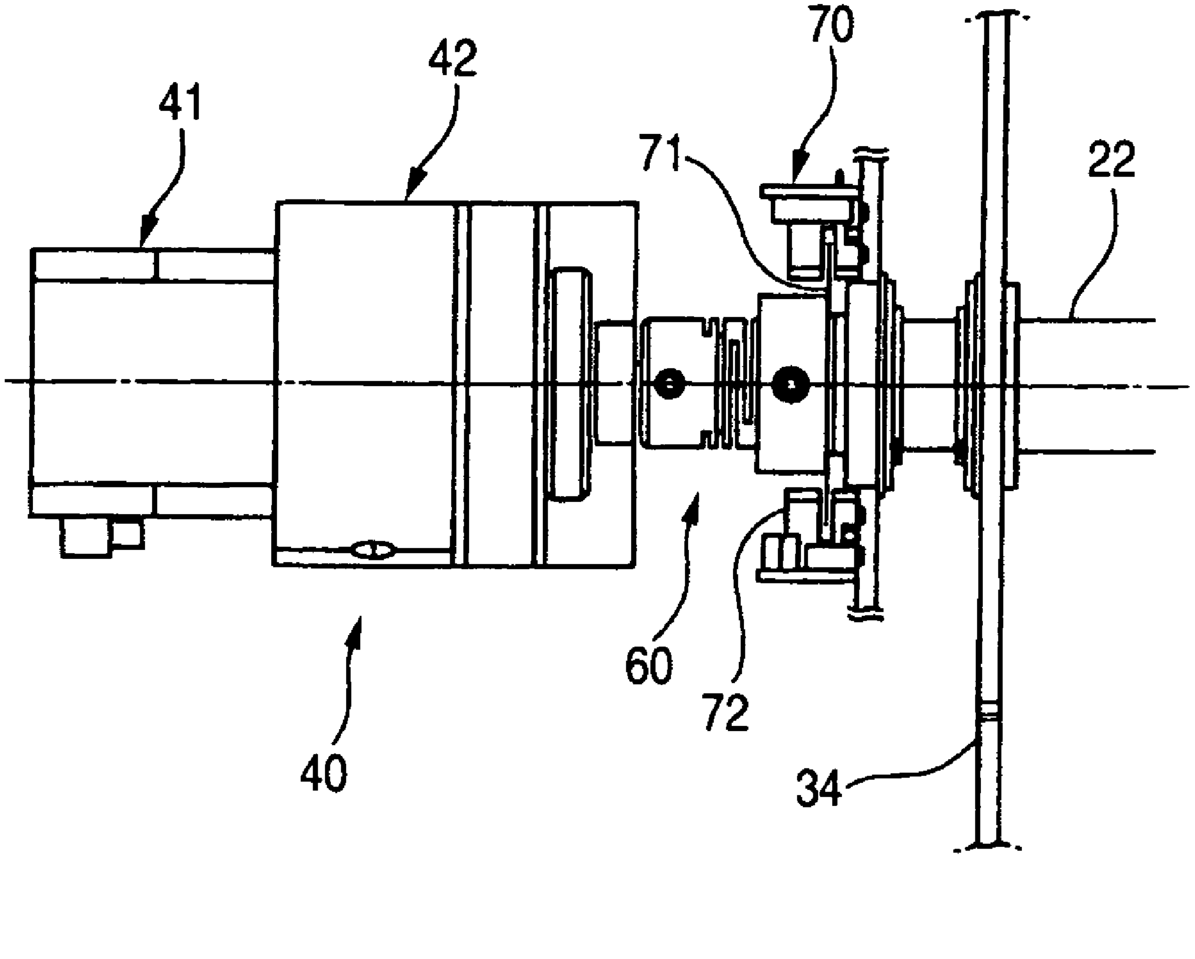
FIG. 8 is an explanatory drawing showing the connection structure between the rotational drive device and a photosensitive drum in the first embodiment.
Figure 9:
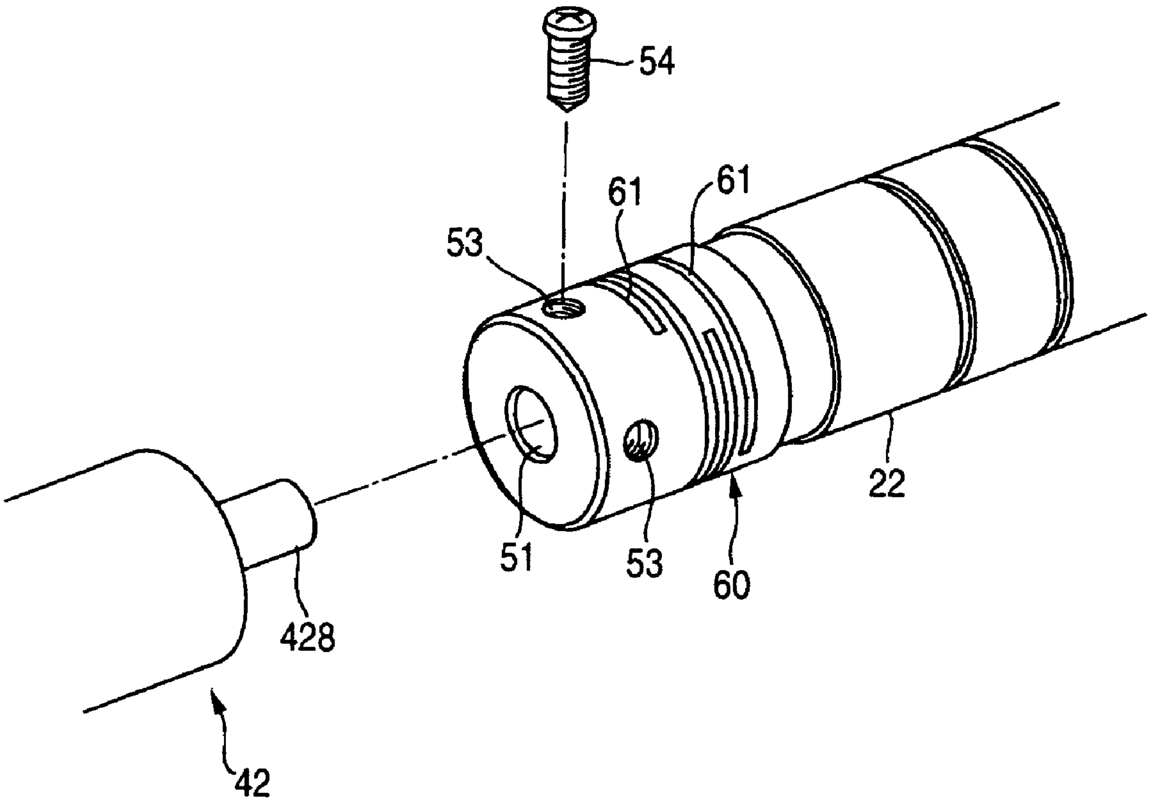
FIG. 9 is an explanatory drawing showing the main portions of the connection structure.

Namely, in the present embodiment, the drive coupling structure is such that, as shown in FIGS. 8 and 9, a coupling hole 51, into which the output drive shaft 428 of the speed-reducing mechanism 42 is fitted and coupled, is formed in an end of the transmission drive shaft 22, one or more female screw holes 53 are formed in sites facing the coupling hole 51 of the transmission drive shaft 22, the output drive shaft 428, which is a coupling shaft, is fitted and coupled in the coupling hole 51, and fasteners 54 such as lock screws are inserted into the screw holes 53 so that both drive shafts 22 and 428 are fixed and coupled together with the fasteners 54.

Here, stainless steel such as SUS304 is used as the material for the transmission drive shaft 22, and the coupling hole 51 of the transmission drive shaft 22 is manufactured simultaneously with the shaft outer periphery.

It should be noted that, although the coupling hole 51 is formed in the transmission drive shaft 22, with the output drive shaft 428 being fitted into the coupling hole 51 and coupled to the transmission drive shaft 22 in the present example, the invention may also be configured so that the coupling hole 51 is formed in the output drive shaft 428, with the transmission drive shaft 22 being fitted into the coupling hole 51 and coupled to the output drive shaft 428.

Moreover, a movable deformation portion 60 is formed at a place removed from the end portion of the transmission drive shaft 22, e.g., in a place corresponding to a deep vicinity of the coupling hole 51. As shown in FIGS. 9 and 10A to 10E, the movable deformation portion 60 is configured by plural slits 61 that are cut into the transmission drive shaft 22 in a direction perpendicular to the axial direction. The slits 61 are deeply cut with a minute width (e.g., about 1 mm) to positions past the coupling hole 51 in the direction perpendicular to the axial direction—e.g., to positions about ⅘ the diameter dimension of the transmission drive shaft 22—and are formed so as to be separated by predetermined intervals (e.g., about 1 mm) along the axial direction of the transmission drive shaft 22. It should be noted that, in FIGS. 10A to 10E, reference numeral 62 represents a cut remnant defining a bottom portion of each slit 61.

Figure 1:
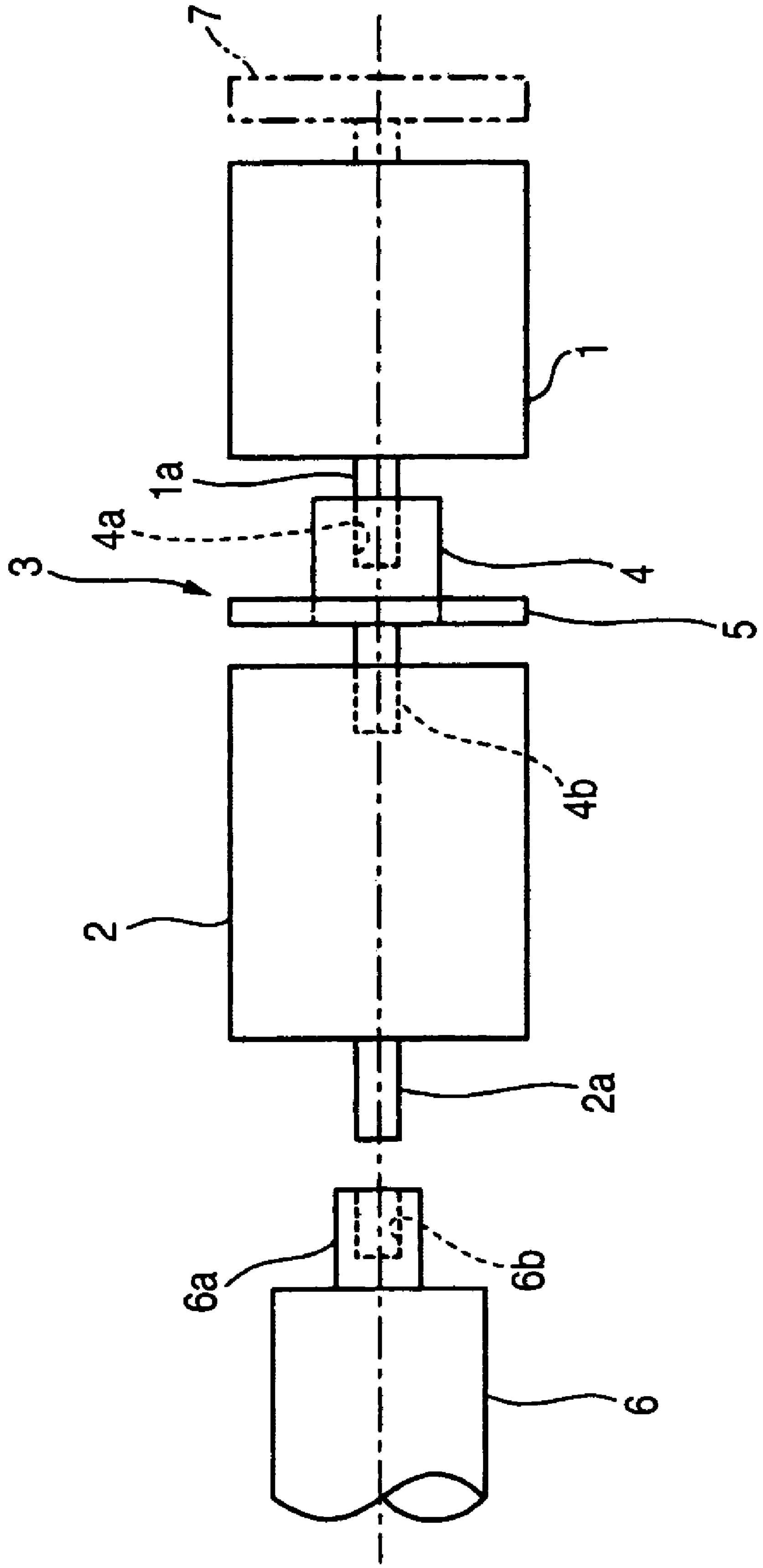
FIG. 1 is an explanatory drawing showing the outline of a rotational drive device pertaining to the invention and a processing device using the rotational drive device.
Figure 10A:
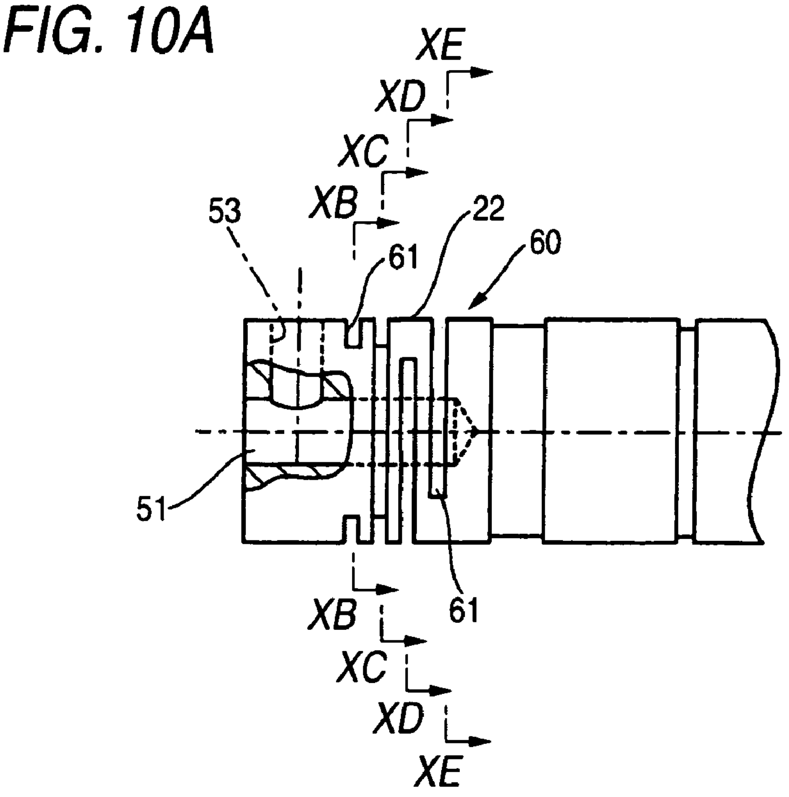
FIGS. 10A to 10E are explanatory drawings showing a movable deformation portion of a transmission drive shaft in the first embodiment, with FIG. 10B being a cross-sectional view along line XB-XB of FIG. 10A, FIG. 10C being a cross-sectional view along line XC-XC of FIG. 10A, FIG. 10D being a cross-sectional view along line XD-XD of FIG. 10A, and FIG. 10E being a cross-sectional view along line XE-XE of FIG. 10A.
Figure 10B:
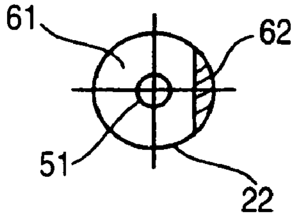
Figure 10C:
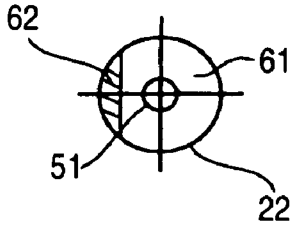
Figure 10D:
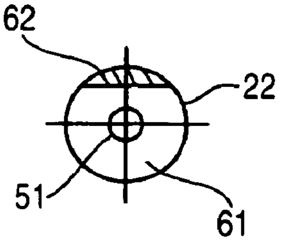
Figure 10E:
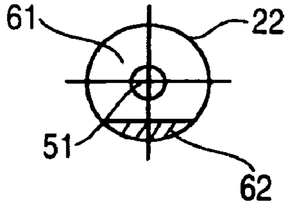

Also, in the present embodiment, each slit 61 is disposed at a predetermined angle of anomaly in the circumferential direction of the transmission drive shaft 22. In the present example, the angle of anomaly between the slits 61 is set to 90°. As shown in FIGS. 10A to 1E, the cut position of the second slit 61 is disposed so as to deviate 180°, the cut position of the third slit 61 is disposed so as to deviate 90° and the cut position of the fourth slit 61 is disposed so as to deviate 270° with respect to the cut position (see FIG. 10B) of the first slit 61 positioned at the end portion side of the transmission drive shaft 22. Here, although there are no particular limitations on the number of the slits 61, it is preferable, in consideration of evenness, for the number to be multiples of 4 (4, 8, and so on) if, for example, the angle of anomaly between the slits 61 is 90°.

It should be noted that, although the place at which the movable deformation portion 60 is formed is disposed within the depth dimension of the coupling hole 51 of the transmission drive shaft 22 in the present example, the place at which the movable deformation portion 60 is formed is not limited thereto and may also be formed at a place equal to or further removed in the depth dimension of the coupling hole 51 from the end portion of the drive transmission shaft 22. Also, although the movable deformation portion 60 is formed in the transmission drive shaft 22 in the present example, the movable deformation portion 60 may, of course, also be formed in the output drive shaft 428.

Moreover, in the present embodiment, as shown in FIG. 8, a rotary encoder 70 is mounted at the side opposite from the rotational drive device 40, with the movable deformation portion 60 of the transmission drive shaft 22 being sandwiched between the rotary encoder 70 and the rotational drive device 40. The rotary encoder 70 is one where a disc 71 in which equidistant slits (not shown) are formed is attached to the outer periphery of the transmission drive shaft 22, a photosensor 72 in which a light-emitting element and a light-receiving element are disposed opposite from each other is disposed at a position sandwiching the slit portions of the disc 71, and rotation information of the transmission drive shaft 22 is detected on the basis of optical information from the photosensor 72.

Rotation information from the rotary encoder 70 is imported to an unillustrated control device, and the control device grasps velocity fluctuations of the transmission drive shaft 22 on the basis of the rotation information from the rotary encoder 70 and conducts closed-loop feedback control with respect to the drive motor 41.

Next, the operation of the image forming device pertaining to the present embodiment will be described with emphasis given to the rotational drive device.

In the present embodiment, the drive motor 41 and the speed-reducing mechanism 42 of the rotational drive device 40 are coaxially coupled together via the input coupling 43.

In a case where, for example, a stepping motor is used as the drive motor 41, it is easy for vibration to arise in the output shaft 412 of the drive motor 41 in accompaniment with the resonance of the drive motor 41. However, because the input coupling 43 is disposed with the flywheel 110 at part of the outer peripheral surface of the coupling body 100 in the present embodiment, vibration from the output shaft 412 of the drive motor 41 is effectively damped by the inertial force of the flywheel 110.

For this reason, vibration from the drive motor 41 can be effectively damped without adding a vibration damping member such as an external flywheel to the opposite side of the output shaft 412 of the drive motor 41 and without adding a vibration damping member such as an external flywheel to one end side of the photosensitive drum 20.

In particular, if the flywheel 110 is of the aspect using the rubber seal bearing 130 as in FIGS. 6A and 6B or is of the aspect using the rubber ring 140 as in FIG. 7A, the flywheel 110 more effectively acts as a dynamic damper due to the elastic action of the rubber seal or rubber ring 140, so that the vibration from the drive motor 41 is more reliably damped.

This vibration damping performance will be confirmed in the examples described later.

Also, in the present embodiment, as shown in FIG. 9, the transmission drive shaft 22 of the photosensitive drum 20 is coupled to the speed-reducing mechanism 42 of the rotational drive device 40 by fitting the output drive shaft 428 of the speed-reducing mechanism 42 into the coupling hole 51 and coupling and fixing both with the fastener 54.

In this case, because the coupling hole 51 can be manufactured simultaneously with the outer periphery of the transmission drive shaft 22, the center shift length of the coupling hole 51 is held to 5 μm or less, and the center of the coupling hole 51 (central axis of the coupling hole 51) is precisely adjusted. For this reason, it is possible to keep center shifting smaller than in an aspect where a shaft coupling (slit coupling, etc.) serving as a separate member is coupled to the transmission drive shaft 22, which is preferable in that it is possible to set the axial-direction length of the connection portion between the photosensitive drum 20 and the rotational drive device 40 to be small because a shaft coupling is not intervened.

Also, by inserting and fixing the fastener 54 in the female screw hole 53 as the coupling and fixing unit of both drive shafts 22 and 428, the center shift of both drive shafts 22 and 428 is kept sufficiently low so that the precision with which the centers are aligned is excellently maintained.

Moreover, in the present embodiment, because the movable deformation portion 60 of the slit 61 configuration is formed in the transmission drive shaft 22 as shown in FIGS. 2 and 9, the transmission drive shaft 22 is swingably displaceable with respect to the shaft center. This corresponds to an aspect where a function corresponding to a slit coupling is integrally incorporated in part of the transmission drive shaft 22. For this reason, even if the shaft center of the rotational drive device 40 is attached to the shaft center of the transmission drive shaft 22 of the photosensitive drum 20 with a predetermined angle of deviation due to mounting error of the rotational drive device 40, shaft center shifting resulting from the angle of deviation is absorbed by the deformation of the movable deformation portion 60 of the transmission drive shaft 22.

Thus, the shaft reaction force acting on the shaft-receiving portions 33 and 34 of the photosensitive drum 20 is kept sufficiently low.

Moreover, in the present embodiment, because the velocity fluctuation of the transmission drive shaft (normally corresponding to the portion where rotation unevenness is to be suppressed) 22 of the photosensitive drum 20 is directly measured by the rotary encoder 70 (see FIG. 8) and a feedback control system is used, speed unevenness resulting from the drive motor 41 and the speed-reducing mechanism 42 is reduced, it becomes possible to reduce eccentric error arising in a case where there is an angle of deviation and, as a result, speed unevenness of the transmission drive shaft 22 of the photosensitive drum 20 can be kept extremely small.

Also, in the present embodiment, the movable deformation portion 60 includes a high allowance with respect to the angle of deviation as mentioned above, but allowance with respect to center shift length is small.

However, by using stainless steel such as SUS304 for the material of the transmission drive shaft 22 of the photosensitive drum 20 as in the present embodiment, a surface treatment is unnecessary because corrosion resistance is good, the inner diameter of the coupling hole 51 for inserting the coupling shaft 52 can be managed with high precision and, as a result, the center shift length can be suppressed as much as possible. In a case where nickel-plated carbon steel is used as the material of the transmission drive shaft 22, it is easy for the inner diameter of the coupling hole 51 to become difficult to manage with high precision because it is about 10 μm due to unevenness in the thickness of the plated layer.

Additionally, because the torsional rigidity of the transmission drive shaft 22 is higher in the case of stainless steel than aluminium or plastic, the responsiveness of the driving force is excellently maintained and it is suited for conducting feedback control.

It should be noted that, although a model using the rotary encoder 70 is described in the present embodiment, the invention is not limited thereto and can, of course, also be applied to a model not using the rotary encoder 70.

Second Embodiment

Figure 11:
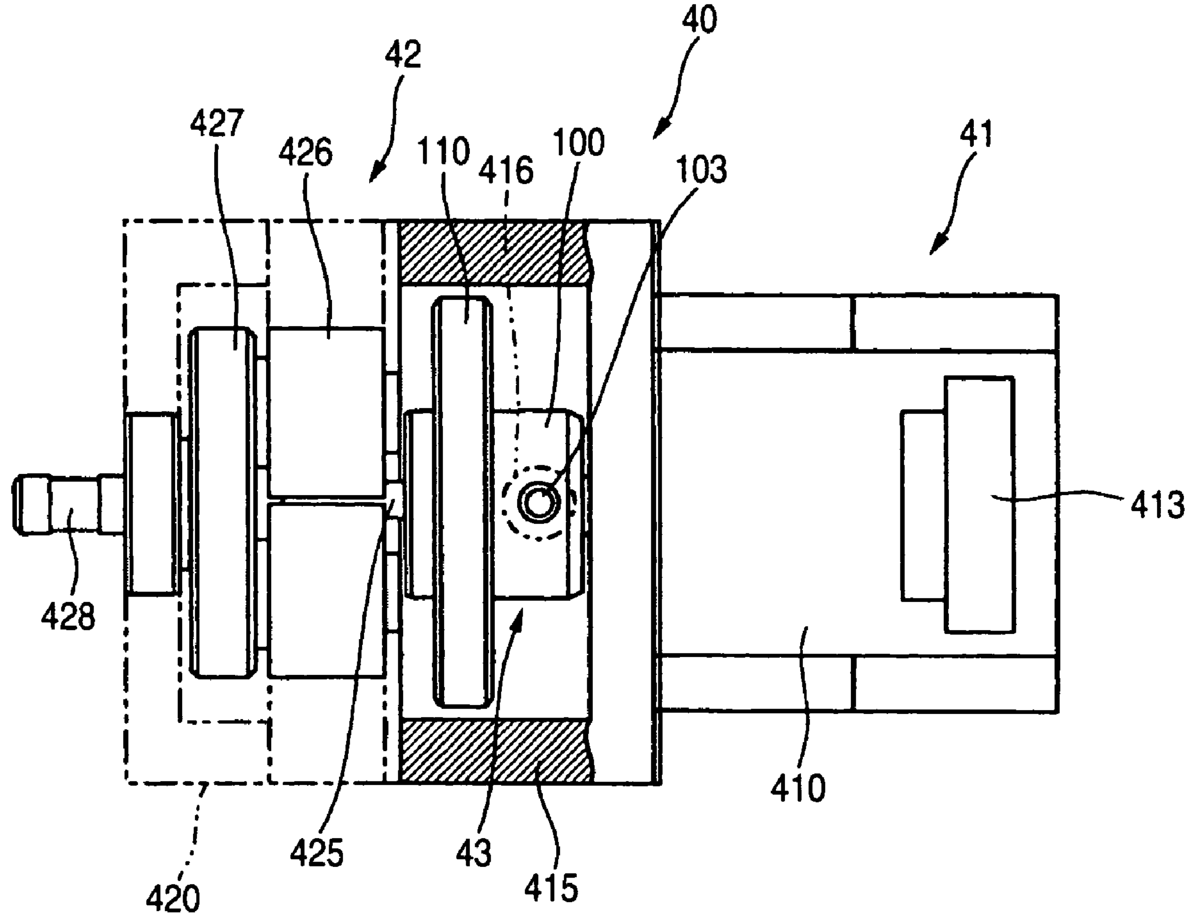
FIG. 11 is an explanatory view showing the outline of a rotational drive device used in a second embodiment.
Figure 12:
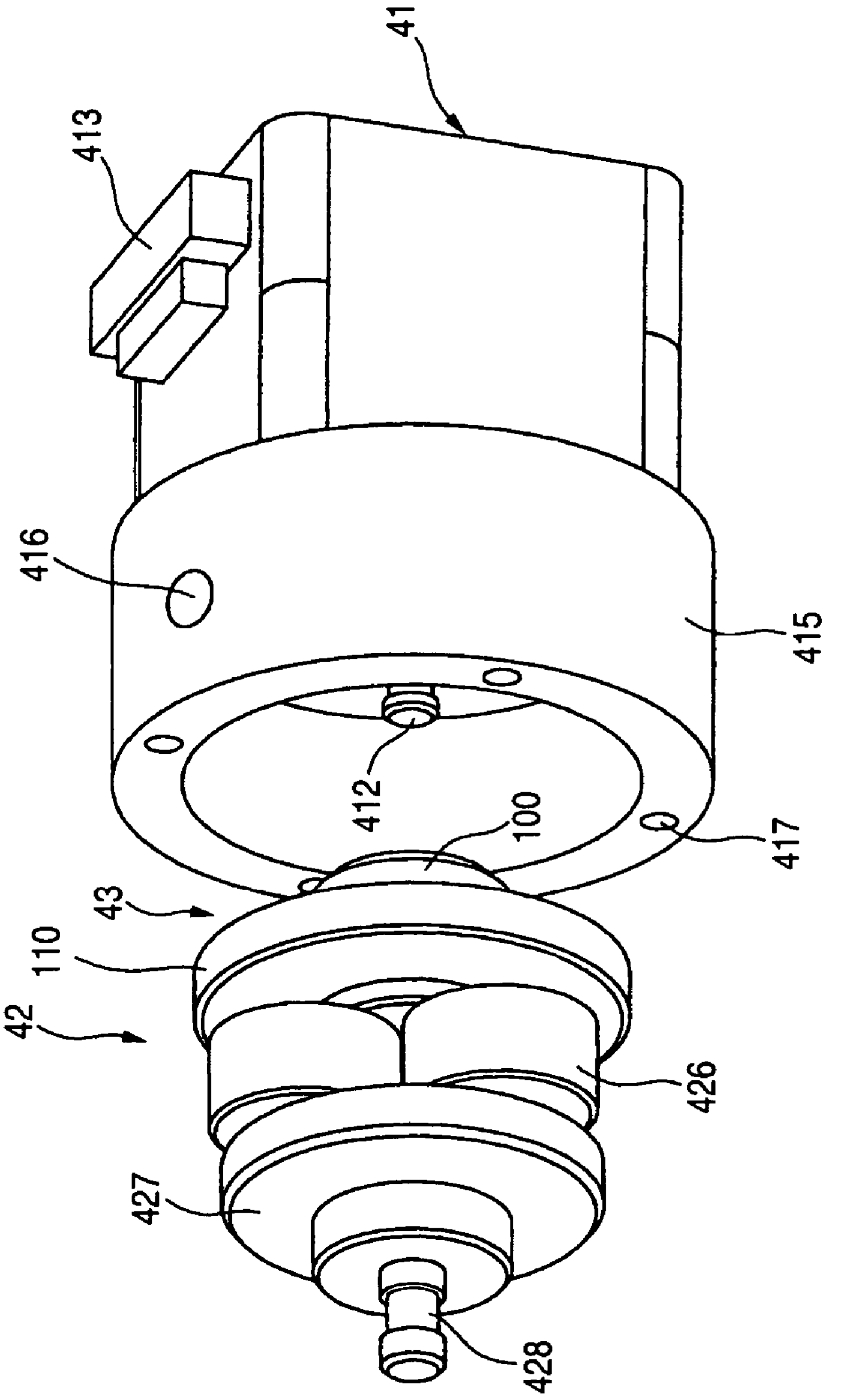
FIG. 12 is an exploded perspective view of the rotational drive device used in the second embodiment.

FIGS. 11 and 12 show a second embodiment of a rotational drive device to which the invention has been applied.

In FIGS. 11 and 12, the rotational drive device 40 is one where, substantially similarly to that of the first embodiment, the drive motor 41 and the speed-reducing mechanism 42 are coaxially coupled together with the input coupling 43, and the flywheel 110 is disposed at the input coupling 43. However, in contrast to the first embodiment, a cylindrical projecting portion 415 that can accommodate the input coupling 43 is disposed at part of the joint flange of the motor housing 410 to configure part of the housing 420 of the speed-reducing mechanism 42.

Additionally, a working hole 416 for coupling the input coupling 43 with the output shaft 412 of the drive motor 41 is formed in the cylindrical projecting portion 415. Also, mounting holes 417 for fixing the input coupling 43 to the housing 420 of the speed-reducing mechanism 42 are formed in an end portion of the cylindrical projecting portion 415. It should be noted that the same reference numerals are added to constituent elements that are the same as those in the first embodiment, and that detailed description of those same constituent elements will be omitted.

Thus, according to the present aspect, the invention has basically the same action as that of the first embodiment, it becomes unnecessary to fit the drive motor 41 together with the speed-reducing mechanism 42, and the drive motor 41 and the speed-reducing mechanism 42 are joined together after the centers have been directly aligned with respect to the input coupling 43. Therefore, the number of parts is reduced, assembly becomes easy, and the axial-direction length of the rotational drive device can be shortened.

EXAMPLE 1

The present example is one where the input coupling 43 of the model of the first embodiment is disposed with the flywheel 110 using the ordinary bearing 130 (see FIGS. 6A and 6B).

As a comparative example, an aspect is selected where an input coupling not having the flywheel 110 (damper) is used.

Here, the experimental conditions of Example 1 are as follows.

Coupling Body:
- Material: carbon steel S45C
- Outer diameter: 12 mm
- Axial-direction length: 17 mm Flywheel Configuration:
- Bearing:
- Width dimension: 8 mm
- Outer diameter: 28 mm
- Damper Ring:
- Material: brass C3604B (relative density of 8.65 g/cm$^3$)
- Width dimension: 6 mm
- Outer diameter: 41 mm It should be noted that the comparative example is disposed only with a coupling body that is the same as that in Example 1.

Figure 13:
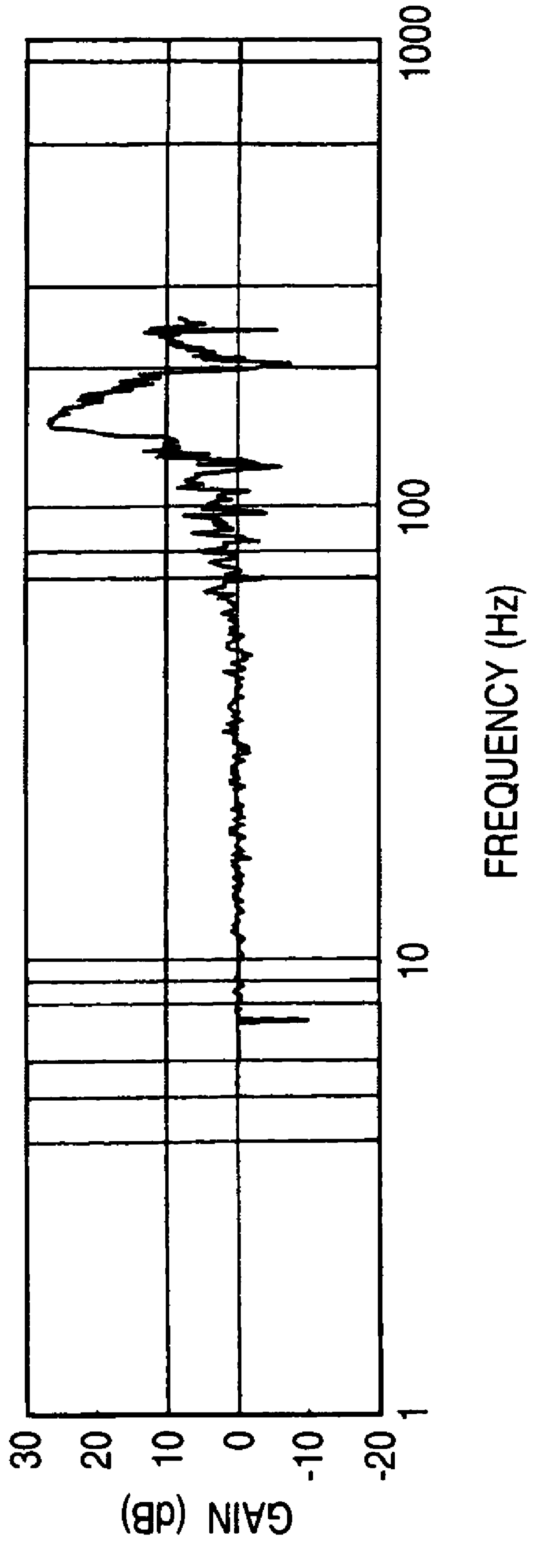
FIG. 13 is an explanatory drawing showing frequency-gain characteristics in a comparative example (without a damper)
Figure 14:
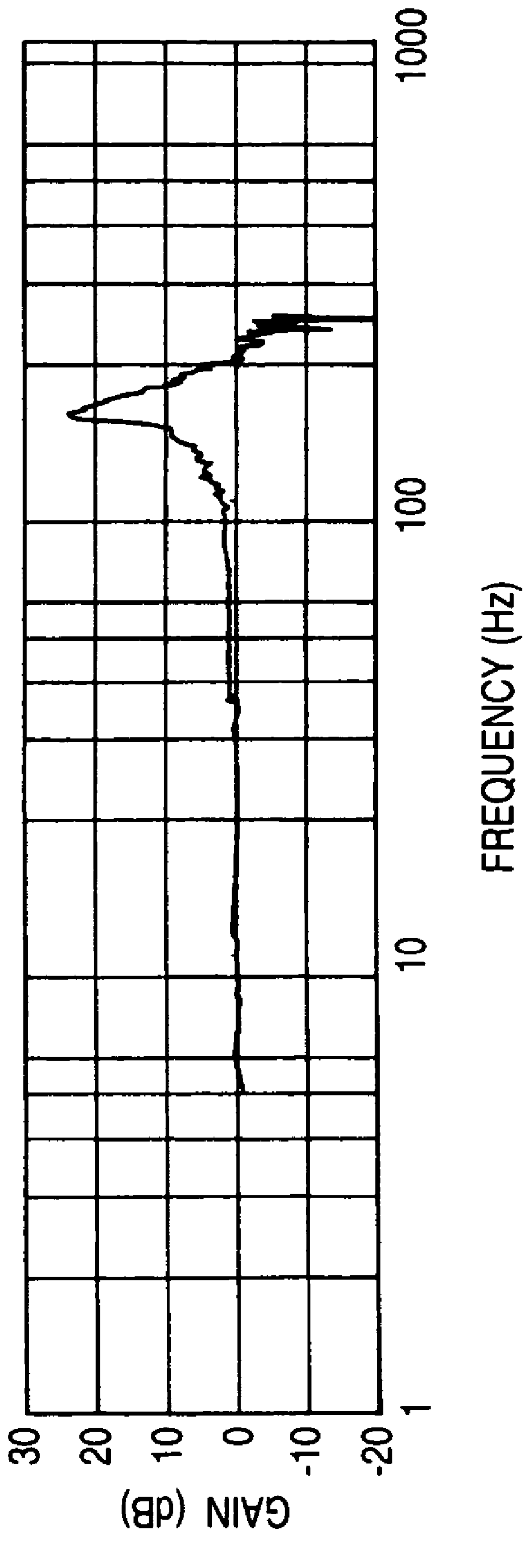
FIG. 14 is an explanatory drawing showing frequency-gain characteristics in Example 1 (damper using an ordinary bearing)

When the transfer function (frequency-gain characteristics) from the drive motor 41 to the output shaft of the speed-reducing mechanism 42 is investigated with respect to Example 1 and the comparative example, the results shown in FIGS. 13 and 14 are obtained.

First, in looking at the frequency-gain characteristics of the comparative example (FIG. 13), it will be understood from the fact that the line in the graph is not smooth that the drive transmission system is unstable overall.

In contrast, according to the frequency-gain characteristics of Example 1 (FIG. 14), it will be understood that the line in the graph is relatively smooth in comparison to that of the comparative example and that the drive transmission system is stable in comparison to that of the comparative example.

Figure 17A:
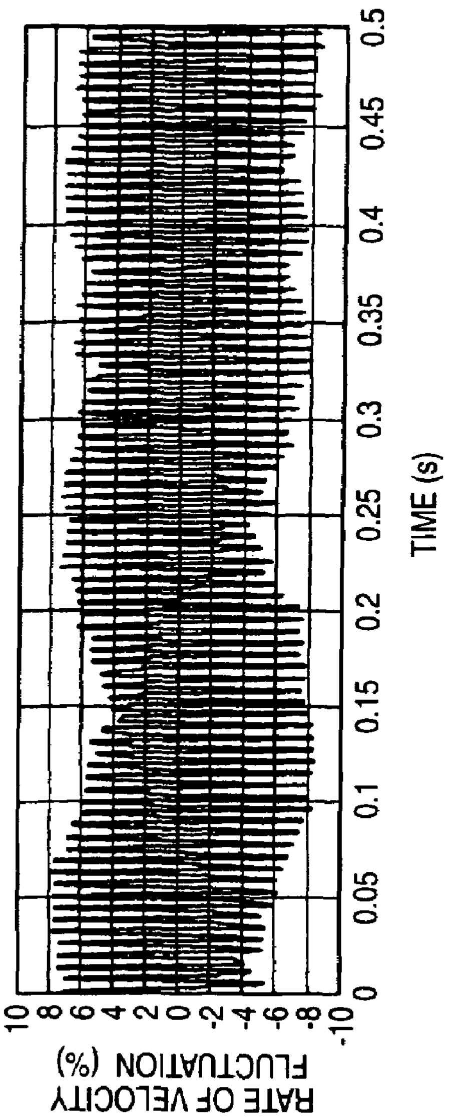
FIG. 17A is an explanatory drawing showing the relation between time and the rate of velocity variation in the comparative example (without a damper)
Figure 17B:
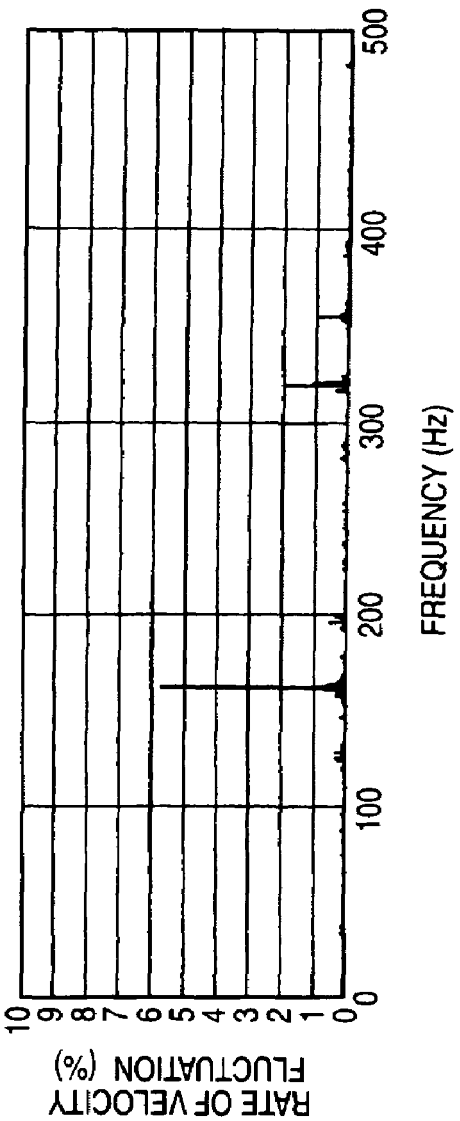
FIG. 17B is an explanatory drawing showing the relation between frequency and the rate of velocity variation where the frequency in FIG. 17A has been analyzed.
Figure 18A:
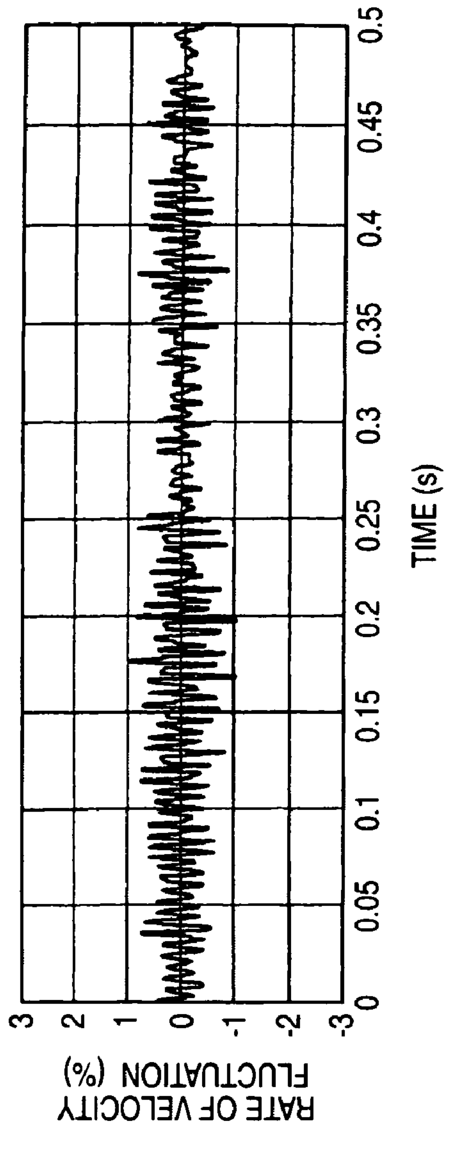
FIG. 18A is an explanatory drawing showing the relation between time and the rate of velocity variation in Example 1 (damper using an ordinary bearing)
Figure 18B:
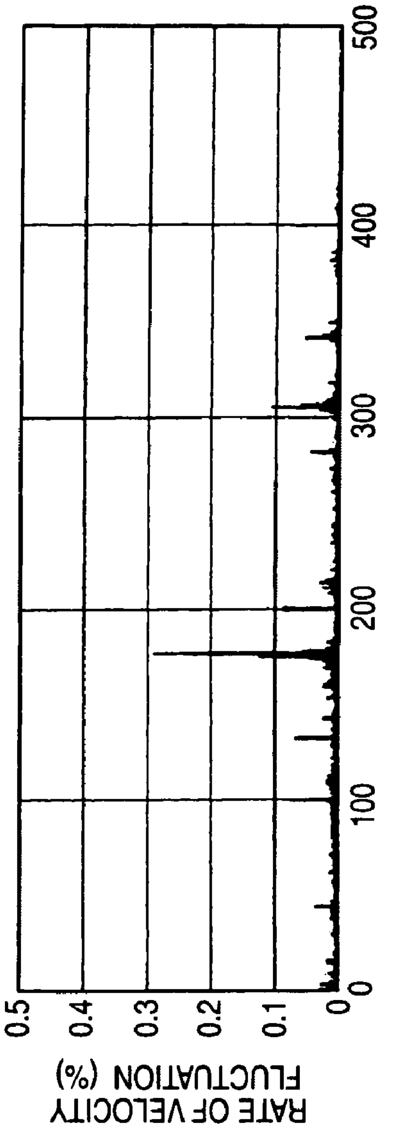
FIG. 18B is an explanatory drawing showing the relation between frequency and the rate of velocity variation where the frequency in FIG. 18A has been analyzed.

Also, when the time-series changes in the rate of velocity fluctuation are investigated with respect to Example 1 and the comparative example, the results shown in FIGS. 17A and 18A are obtained. It should be noted that FIGS. 17B and 18B are graphs where the frequency of the waveforms of FIGS. 17A and 18A are analyzed.

According to these graphs, it will be understood that velocity fluctuation in Example 1 is held to be smaller overall in comparison to that in the comparative example.

EXAMPLE 2

The present example is one where the input coupling 43 of the model of the first embodiment is disposed with the flywheel 110 using rubber (the rubber ring 140) (see FIG. 7A).

The experimental conditions of Example 2 are substantially the same as those of Example 1 except that, in addition to the ordinary bearing 130 of Example 1, the rubber ring 140 is adhered to the coupling body 100 and the damper ring 141.

Figure 15:
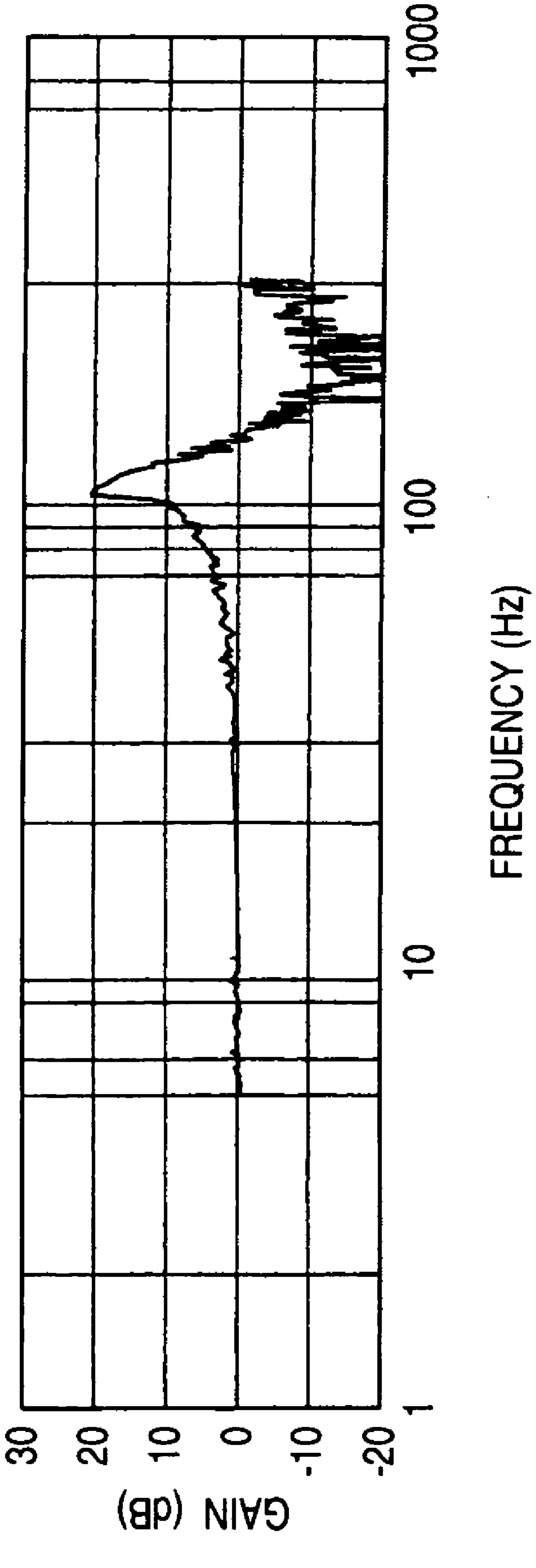
FIG. 15 is an explanatory drawing showing frequency-gain characteristics in Example 2 (damper using rubber)

When the transfer function (frequency-gain characteristics) from the drive motor 41 to the output shaft 428 of the speed-reducing mechanism 42 is investigated with respect to Example 2, the results shown in FIG. 15 are obtained.

According to the frequency-gain characteristics of Example 2 (FIG. 15), it will be understood that, similar to Example 1, the graph is relatively smooth and that the drive transmission system is stable in comparison to the comparative example. Additionally, because there is a spring effect resulting from the rubber, the frequency at the resonance point is low in comparison to those in the comparative example and Example 1.

Figure 19A:
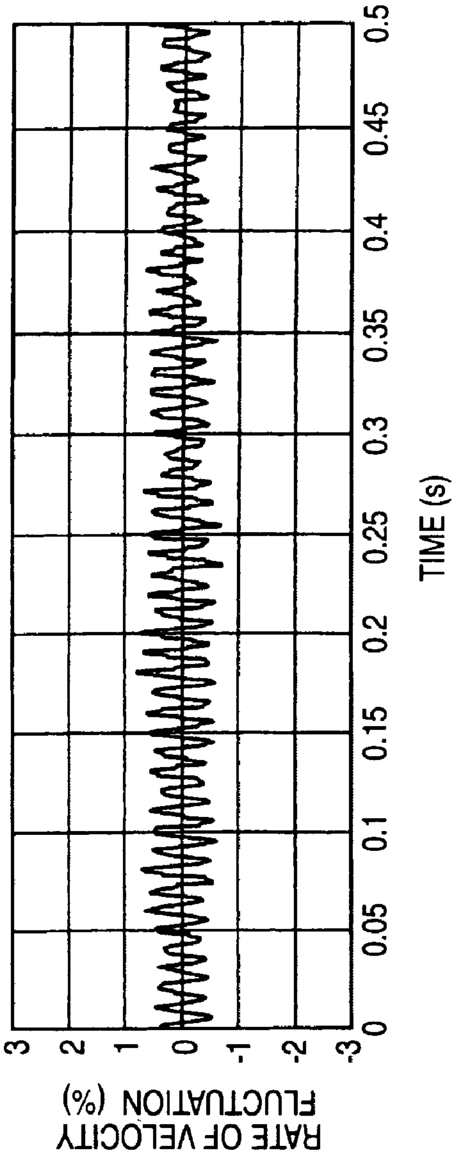
FIG. 19A is an explanatory drawing showing the relation between time and the rate of velocity variation in Example 2 (damper using rubber)
Figure 19B:
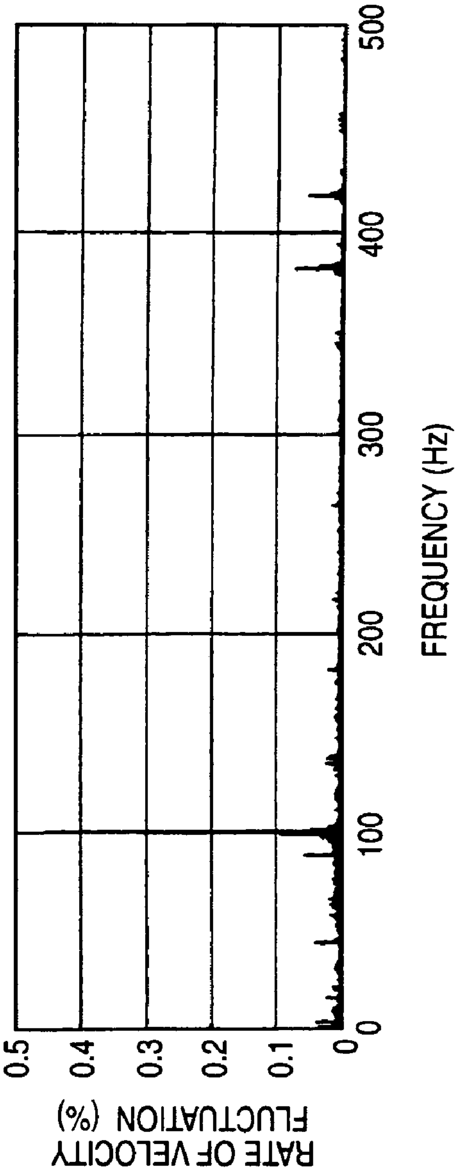
FIG. 19B is an explanatory drawing showing the relation between frequency and the rate of velocity variation where the frequency in FIG. 19A has been analyzed.

Also, when the time-series changes in the rate of velocity fluctuation are investigated, the results shown in FIG. 19A are obtained. It should be noted that FIG. 19B is a graph where the frequency of the waveform of FIG. 19A is analyzed.

According to these graphs, it will be understood that, although vibration of 100 Hz largely remains in Example 2 because it is easy for a vibration of 100 Hz to be outputted from the motor used in the experiment, vibration of a frequency other than this is small.

EXAMPLE 3

The present example is one where the input coupling 43 of the model of the first embodiment is disposed with the flywheel 110 using the rubber seal bearing 130 (see FIGS. 6A and 6B).

Here, the experimental conditions in Example 3 are substantially the same as those of Example 1 except that, in addition to the ordinary bearing of Example 1, the rubber seal bearing is used.

Figure 16:
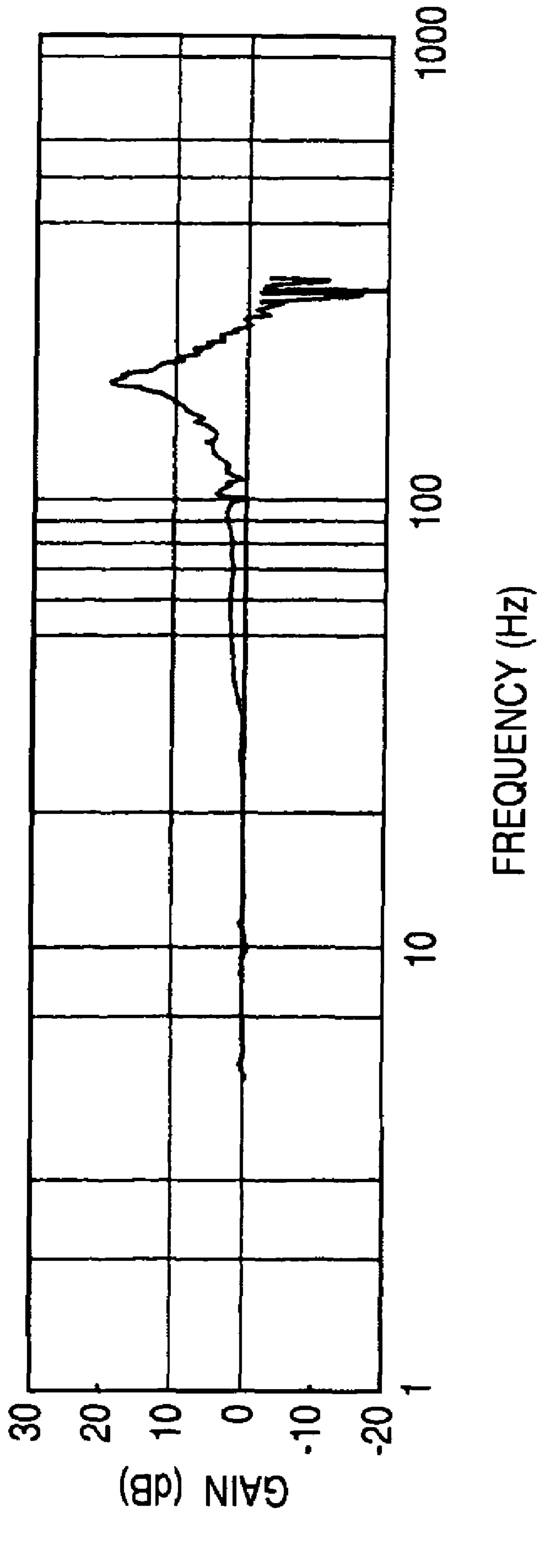
FIG. 16 is an explanatory drawing showing frequency-gain characteristics in Example 3 (damper using a rubber seal bearing)

When the transfer function (frequency-gain characteristics) from the drive motor 41 to the output shaft of the speed-reducing mechanism 42 is investigated with respect to Example 3, the results shown in FIG. 16 are obtained.

According to the frequency-gain characteristics of Example 3 (FIG. 16), it will be understood from the fact that the graph is relatively smooth, similar to Example 1, and the mountain of resonance is smoother than that in Example 1 that the vibration damping characteristics are superior to those of Example 2. For this reason, it will be understood that the frequency characteristics of Example 3 are more stable than those of the comparative example, Example 1 and Example 2.

Figure 20A:
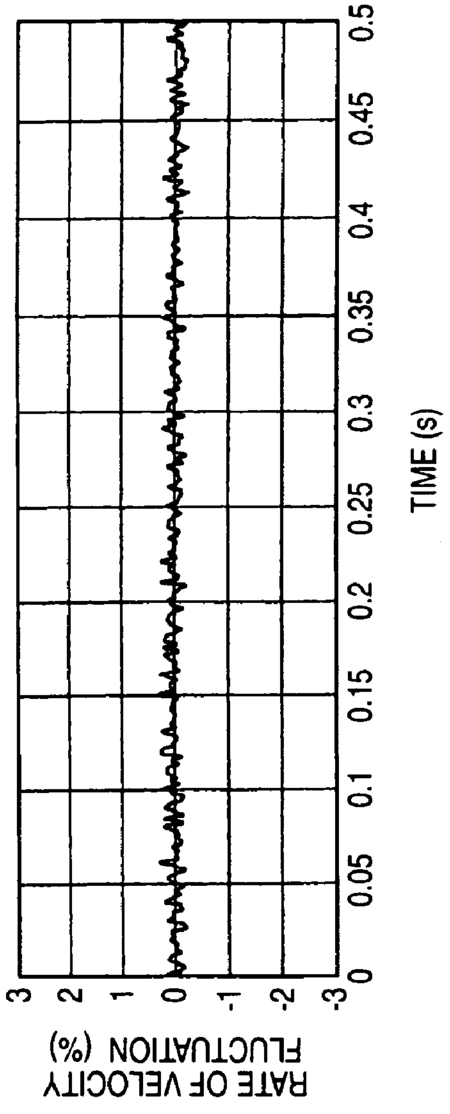
FIG. 20A is an explanatory drawing showing the relation between time and the rate of velocity variation in Example 3 (damper using a rubber seal bearing)
Figure 20B:
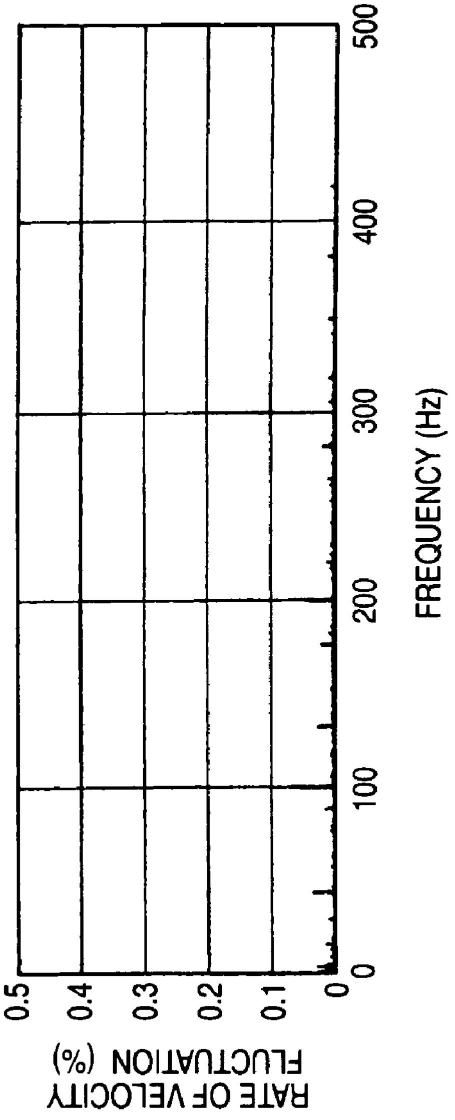
FIG. 20B is an explanatory drawing showing the relation between frequency and the rate of velocity variation where the frequency in FIG. 20A has been analyzed.
Figure 21:
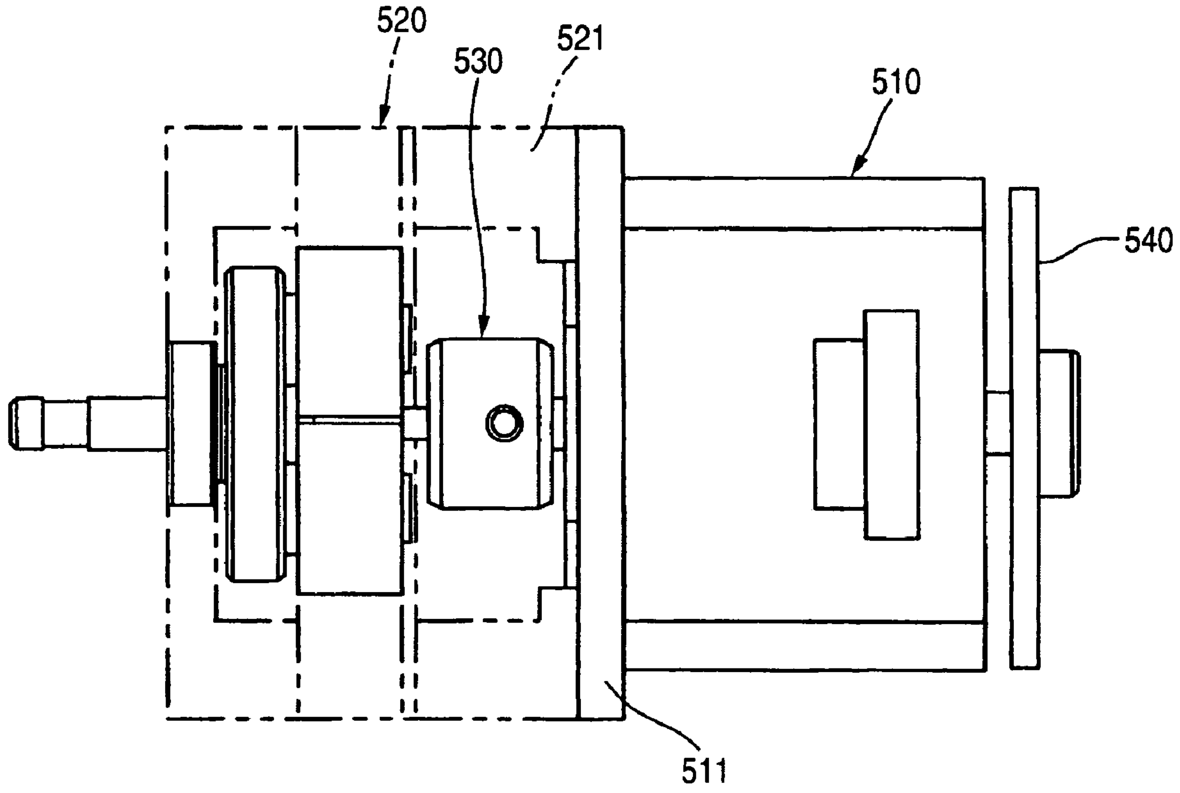
FIG. 21 is an explanatory drawing showing an example of a conventional rotational drive device.
Figure 22:
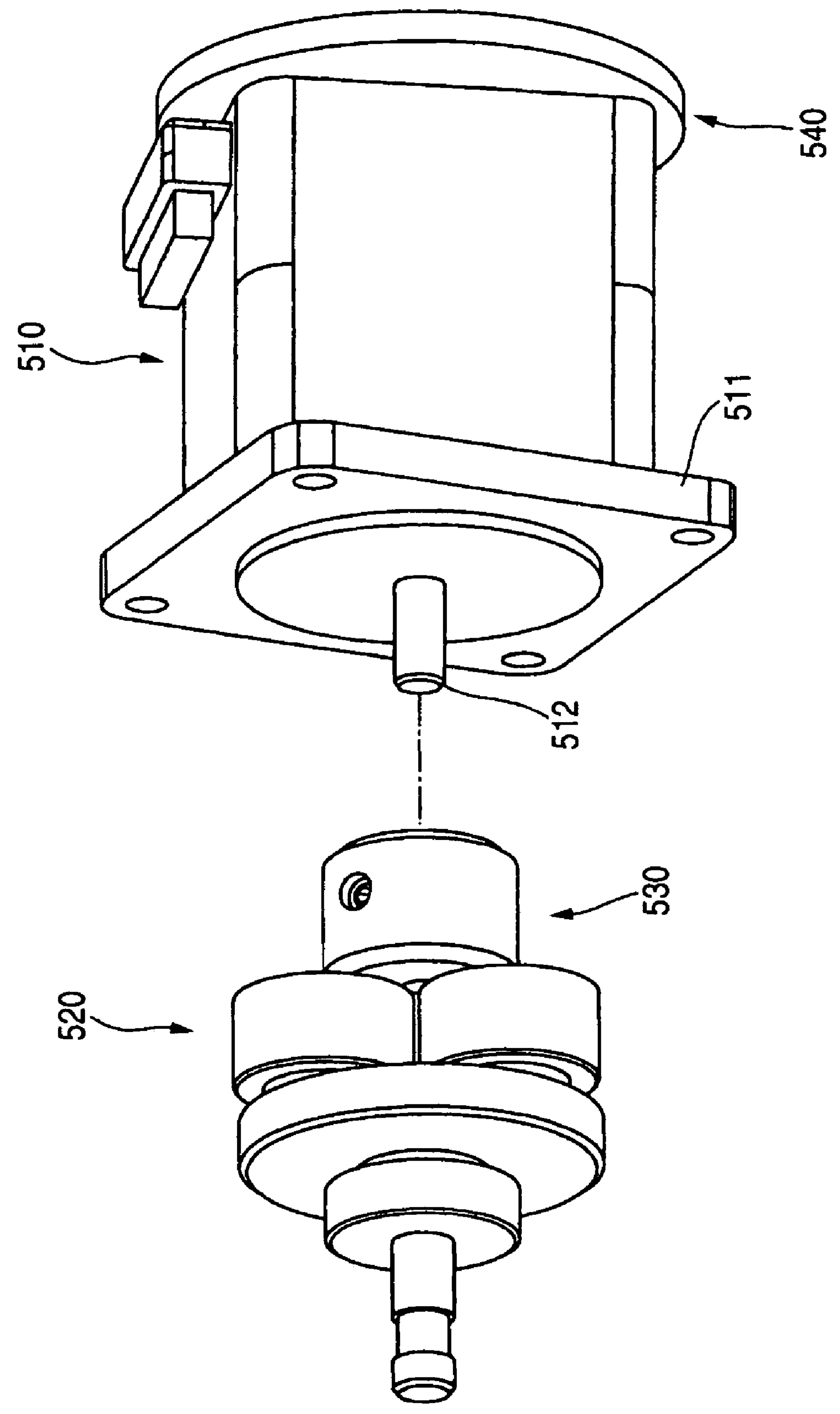
FIG. 22 is an exploded perspective view of the conventional rotational drive device.

Also, when the time-series changes in the rate of velocity fluctuation are investigated with respect to Example 3, the results shown in FIG. 20A are obtained. It should be noted that FIG. 20B is a graph where the frequency of the waveform of FIG. 20A is analyzed.

According to these graphs, it will be understood that the velocity fluctuation in Example 3 is held to be extremely smaller than that in the comparative example and Example 1 and Example 2.

Further, the preferred embodiments of the present invention are described below.

(1) In the rotational drive device of the present invention, the drive motor is a stepping motor.

(2) In the rotational drive device of the present invention, the drive transmission mechanism is a planetary speed-reducing mechanism.

(3) In the rotational drive device of the present invention, the vibration damper is configured by a flywheel that uniformly projects in the radial direction from the outer peripheral portion of the coupling body.

(4) In the rotational drive device of the present invention, the vibration damper is configured by a member that is separate from the coupling body.

(5) In the rotational drive device of the present invention, the vibration damper is integrally formed with the coupling body.

(6) In the rotational drive device of the present invention, the vibration damper is a flywheel with a thickness dimension that is shorter than the thickness direction dimension of the outer peripheral portion of the coupling body.

(7) In the rotational drive device of the present invention, the vibration damper is a flywheel including an elastic body.

(8) In the rotational drive device of the present invention, the vibration damper is a flywheel in which an annular member is coupled to the coupling body via the elastic body.

(9) In the rotational drive device of the present invention, the vibration damper is configured by a flywheel having an outer diameter that is three or more times the axial diameter of the drive motor.

(10) In the rotational drive device of the present invention, the drive motor includes a motor housing where at least part of the drive transmission mechanism housing is integrally disposed with part of the motor housing.

The present invention also provides a processing device disposed with the above-described rotational drive device and a rotated body that is rotatingly driven by the rotational drive device.

The present invention can be applied to a printer having a rotational drive device.

The entire disclosure of Japanese Patent Application No. 2003-307320 filed on Aug. 29, 2003 including specification, claims, drawings and abstract is incorporated herein by reference in its entirety.

What is claimed is:

1. A rotational drive device where a drive motor and a drive transmission mechanism are coupled together via an input coupling, wherein the input coupling includes a coupling body that is coupled and fixed to an output shaft of the drive motor, and a vibration damper that damps vibration from the drive motor is disposed at an outer peripheral portion of the coupling body.

2. The rotational drive device of claim 1, wherein the drive motor is a stepping motor.

3. The rotational drive device of claim 1, wherein the drive transmission mechanism is a planetary speed-reducing mechanism.

4. The rotational drive device of claim 1, wherein the vibration damper is configured by a flywheel that uniformly projects in the radial direction from the outer peripheral portion of the coupling body.

5. The rotational drive device of claim 1, wherein the vibration damper is configured by a member that is separate from the coupling body.

6. The rotational drive device of claim 1, wherein the vibration damper is integrally formed with the coupling body.

7. The rotational drive device of claim 4, wherein the vibration damper is a flywheel with a thickness dimension that is shorter than the thickness direction dimension of the outer peripheral portion of the coupling body.

8. The rotational drive device of claim 4, wherein the vibration damper is a flywheel including an elastic body.

9. The rotational drive device of claim 8, wherein the vibration damper is a flywheel in which an annular member is coupled to the coupling body via the elastic body.

10. The rotational drive device of claim 4, wherein the vibration damper is configured by a flywheel comprising an outer diameter that is three or more times the axial diameter of the drive motor.

11. The rotational drive device of claim 1, wherein the drive motor includes a motor housing where at least part of the drive transmission mechanism housing is integrally disposed with part of the motor housing.

12. A printer comprising:

a rotational drive device where a drive motor and a drive transmission mechanism are coupled together via an input coupling, wherein the input coupling includes a coupling body that is coupled and fixed to an output shaft of the drive motor, and a vibration damper that damps vibration from the drive motor is disposed at an outer peripheral portion of the coupling body.

* * * * *